US012516568B1

(12) United States Patent
Zhu et al.

(10) Patent No.: US 12,516,568 B1
(45) Date of Patent: Jan. 6, 2026

(54) ARCHWAY TRUSS DEVICE WITH INTERACTIVE EXIT LANES

(71) Applicant: Walmart Apollo, LLC, Bentonville, AR (US)

(72) Inventors: Feiyun Zhu, Plano, TX (US); Wei Wang, Dallas, TX (US); Raghava Balusu, Andhra Pradesh (IN); Abhinav Pachauri, Karnataka (IN); Vincent St. Jon Cucco, Rogers, AR (US); Michael Alvin Schubert, Jr., Sulphur Springs, AR (US); Avinash Madhusudanrao Jade, Karnataka (IN); Mingquan Yuan, Flower Mound, TX (US); Lingfeng Zhang, Flower Mound, TX (US); William Craig Robinson, Centerton, AR (US); Huanyu Zang, Dallas, TX (US); Zhaoliang Duan, Frisco, TX (US); Han Zhang, Allen, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/013,365

(22) Filed: Jan. 8, 2025

(51) Int. Cl.
*E06B 11/08* (2006.01)
*G07C 9/10* (2020.01)

(52) U.S. Cl.
CPC ............... *E06B 11/08* (2013.01); *G07C 9/10* (2020.01)

(58) Field of Classification Search
CPC .................................. E06B 11/08; G07C 9/10
See application file for complete search history.

(56) References Cited

U.S. PATENT DOCUMENTS 4,672,837 A * 6/1987 Cottrell, Jr. ............ G01V 13/00
324/202
8,654,197 B2 * 2/2014 Nizko ..................... G01S 13/87
348/148

(Continued)

FOREIGN PATENT DOCUMENTS

CA 2683792 A1 * 10/2008 ........... H01Q 21/065
CA 2793229 A1 * 9/2011 ............. G01T 1/167

(Continued)

OTHER PUBLICATIONS

CN212111837U—Security inspection door, 14 pages. (Year: 2025).*

(Continued)

*Primary Examiner* — Tuyen K Vo
(74) *Attorney, Agent, or Firm* — Foley IP Law, PLLC

(57) ABSTRACT

Examples provide an archway truss for supporting devices, such as sensor devices generating sensor data for objects passing through the archway and a digital display device displaying dynamic content to users moving through the archway. The archway truss includes vertical support members attached to a horizontal top member. A central support member is reinforced to protect against cart impacts. Cameras are attached to the archway truss and positioned to capture images of objects in carts moving through the archway truss. Radio frequency identification (RFID) tag readers and other sensor devices are removably attached to the archway truss to gather item identification data for objects in the carts. Pairs of wing barriers are provided for each vertical support to block the field of view of the cameras from objects outside the lanes formed by the archway truss. An exterior covering provides padding to protect users contacting the archway truss.

20 Claims, 18 Drawing Sheets

(56) References Cited

U.S. PATENT DOCUMENTS

| | | | | |
|---|---|---|---|---|
| 2011/0011137 A1* | 1/2011 | Frankel | ........ | E05C 19/184 |
| | | | | 70/93 |
| 2013/0307533 A1* | 11/2013 | Keene | ........ | G01R 33/0047 |
| | | | | 324/244 |
| 2019/0353777 A1* | 11/2019 | Morton | ........ | G01R 33/0206 |
| 2021/0072419 A1* | 3/2021 | Birnkrant | ........ | G01V 3/165 |
| 2023/0005342 A1 | 1/2023 | Brakob et al. | | |
| 2024/0242503 A1 | 7/2024 | Musiani et al. | | |

FOREIGN PATENT DOCUMENTS

| | | | | | |
|---|---|---|---|---|---|
| CA | | 3003206 A1 * | 5/2017 | ........ | G03B 37/00 |
| WO | WO-0229744 A1 * | | 4/2002 | ........ | B64F 1/366 |
| WO | WO-2014058495 A2 * | | 4/2014 | ........ | G21K 1/04 |
| WO | WO-2016097724 A1 * | | 6/2016 | ........ | G01V 3/08 |

OTHER PUBLICATIONS

CN 212206362U—Thermal imaging temperature measuring security inspection door, 17 pages. (Year: 2025).*

CN 219831417U—Combined security inspection door, 13 pages. (Year: 2025).*

CN 220795490U—Human body detection alarm device of factory intelligent safety management and control, 25 pages. (Year: 2025).*

CN 2859535Y—A portable security inspecting door, 8 pages. (Year: 2025).*

El-Saba, M.H., "Combining Supervisory Control and Data Acquisition (SCADA) with Artificial Intelligence (AI) as a Video Management System", https://www.researchgate.net/publication/361032967, Jun. 2022, 16 pages.

Unknown, Toll Station, Shutterstock, Sep. 27, 2024, 2 pages.

Unknown, "Finding-the-minimum-number-of-surveillance-cameras-for-room-coverage", GitHub, elaugh9, 2024 (copyright date), 2 pages.

* cited by examiner

ARCHWAY TRUSS DEVICE WITH INTERACTIVE EXIT LANES

BACKGROUND

Computer vision (CV) can be used to identify items in a customer cart or basket using item recognition as a service (IRAS) on images of the items. CV item detection and recognition can be used to verify customer purchases and ensure all items were properly scanned at checkout. However, it is difficult to capture images of items in a cart or basket at exit as the cart or basket is typically in motion and other objects can obstruct the view of cart or basket contents. This renders CV item detection and recognition results at exit error prone and unreliable.

SUMMARY

Some examples provide an archway truss providing support for a plurality of sensor devices. The archway truss includes a first vertical support member forming a first side of a first lane and a second vertical support member forming a second side of the first lane. A horizontal top member is connected to a first connection point of the first vertical support member and a second connection point of the second vertical support member forming an arch associated with the first lane. A first barrier member is removably attached to the first vertical support member. The first barrier member includes a first pair of wing panels extending perpendicular to the first vertical support member. A second barrier member associated with the second vertical support member includes a second pair of the wing panels extending perpendicular to the second vertical support member. The plurality of sensor devices are removably attached to the archway truss. The plurality of sensor devices generate sensor data associated with a set of objects passing through the first lane.

Other examples provide an archway truss having a plurality of sensor devices generating data associated with objects passing through a passageway defined by the archway truss. A first vertical support member includes a first barrier. The first barrier includes a first side panel attached to a first front side of the first vertical support member and a second side panel attached to a first back side of the first vertical support member. A second vertical support member includes a second barrier having a third side panel attached to a second front side of the second vertical support member and a fourth side panel attached to a second back side of the second vertical support member. A central support member is disposed between the first vertical support member and the second vertical support member. A third barrier associated with the central support member includes a fifth side panel attached to a third front side of the central support member and a sixth side panel attached to a third back side of the central support member. A horizontal top member is attached to a first connection point of the first vertical support member, a second connection point of the second vertical support member, and a third connection point of the central support member. A first lane is provided between the first vertical support member and the central support member. A second lane is provided between the second vertical support member and the central support member. A set of image capture devices is removably attached to the archway truss generating images of the objects passing through the first lane and the second lane. A set of RFID tag readers removably attached to the archway truss, the set of RFID tag readers generating sensor data associated with the objects passing through the first lane and the second lane of the archway truss.

Still other examples provide an interactive multi-lane archway truss device. A first vertical support member is connected to a first connection point of a horizontal top member. A first barrier is attached to the first vertical support member. A second vertical support member is connected to a second connection point of the horizontal top member. The first vertical support member, a first portion of the horizontal top member, and the second vertical support member form a first lane for passage of carts through the archway truss device. A first set of cameras is removably attached to the archway truss. The first set of cameras includes a first bottom camera associated with the first vertical support member, a second bottom camera associated with the second vertical support member, and a first top camera associated with the horizontal top member, the first set of cameras positioned to capture images of a first set of objects passing through the first lane. A second barrier is attached to the second vertical support member. The first barrier and the second barrier provide a screen preventing the first set of cameras from capturing images of objects outside the first lane. A third vertical support member is connected to a third connection point of the horizontal top member. The second vertical support member, a second portion of the horizontal top member, and the third vertical support member forming a second lane for a second set of carts to pass through the archway truss device. A second set of cameras is removably attached to the archway truss. The second set of cameras includes a third bottom camera associated with the second vertical support member, a fourth bottom camera associated with the third vertical support member, and a second top camera associated with the horizontal top member. The second set of cameras is positioned to capture images of a second set of objects passing through the second lane. A third barrier is attached to the third vertical support member. The second barrier and the third barrier provide a screen preventing the second set of cameras from capturing images of objects outside the second lane. A digital display device is removably attached to the archway truss device. The digital display device covers at least a portion of a front facing of the archway truss device. The digital display device displays customizable content viewable by users passing through the first lane and the second lane.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
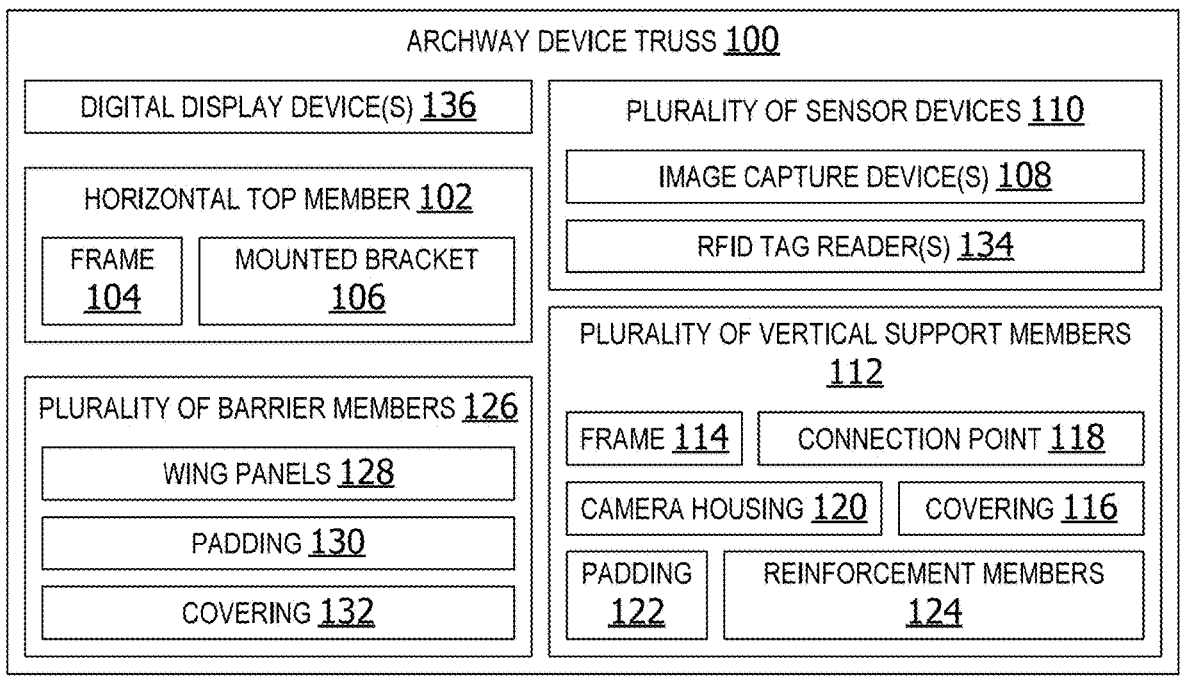
FIG. 1 is an exemplary block diagram illustrating a system for an interactive exit lane via an archway truss device.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Computer vision (CV) can be used to detect and recognize items in images captured by one or more image capture devices. However, CV results can be unreliable for detecting contents of a cart or basket that is in motion. Consequently, there is a need to capture images of the contents of carts and/or baskets with a cost effective number of cameras. Having too many cameras is expensive and potentially cost prohibitive. An insufficient number of cameras positioned at exit renders the system non-functional. Moreover, if cameras are positioned at improper locations or angles, the images generated by the cameras can fail to include all contents of carts and/or baskets. Hence, the system requires a balanced number of cameras with the placement and/or position of said cameras ideally adjusted to maximize efficiency and capture all contents of carts and baskets passing within the field of view (FOV) of each camera.

Referring to the figures, examples of the disclosure enable an archway truss device for supporting a plurality of sensor devices generating sensor data associated with object passing through the archway. In some examples, the archway truss device includes a plurality of barrier members for blocking the field of view of one or more cameras mounted on the archway truss device. The barrier members prevent the cameras from capturing images of objects outside the one or more lanes of the archway truss. This enables more accurate identification of objects of interest in carts passing through the archway truss while reducing errors in item detection and recognition due to detection of objects which are not of interest.

In other embodiments, the archway truss device enables multiple lanes of egress from a checkout area to an exit area through the archway truss. This enables faster and more efficient exit of users from a retail facility while still enabling accurate object detection and recognition of basket contents using CV analysis of images captured by cameras on the archway truss.

Still other embodiments, enable an interactive archway truss device which captures sensor data associated with objects passing through one or more lanes of travel through the archway and provision of customizable content to a user via one or more digital display devices mounted to the archway truss. In this manner, the system both provides data to the archway truss device in the form of dynamic digital video content as well as receive data associated with the objects passing through the archway for more efficient communication with users without impeding or otherwise hampering users exiting the retail facility.

Still other examples provide a multi-lane archway truss device having a digital display device mounted thereon for presentation of digital images or video content to users dynamically as the users move toward an exit. The digital display device receives the content for display, including the digital images and/or video content, via a network from a computing device or cloud server. The computing device operates in an unconventional manner by dynamically generating the content and/or identifying content for presentation to the users from a plurality of available content in a data storage device. The digital display device can act as a user interface (UI) providing information to users without requiring the users to stop moving toward the exit. In this manner, the archway truss device and computing device are used in tandem in an unconventional way, and allows improved user efficiency via the UI interaction and increased user interaction performance without impeding egress of users from the facility, thereby improving the functioning of both the archway truss device and the underlying computing device.

In certain cases, an image capture device can capture images of objects in the background of an image which are not in a cart or basket. The presence of certain items in the background of an image can lead to the shrink where items in another lane are recognized and mistakenly attributed to a customer cart when those items are not actually present in the cart. The barrier members reduce or prevent these occurrences to improve accurate detection of cart contents with reduced errors.

Referring now to FIG. 1, an exemplary block diagram illustrating a system for an interactive exit lane via an archway truss device 100 is shown. The archway truss device 100 includes a horizontal top member 102. The horizontal top member 102 has a frame 104. The frame 104, in some embodiments, is a metal frame. However, the embodiments are not limited to a metal frame. In other embodiments, the frame 104 is composed of any other appropriate material.

The horizontal top member 102, in some embodiments, includes a mounting bracket 106 or other attachment device for removably attaching an image capture device, such as, but not limited to, the one or more image capture device(s) 108 in the plurality of sensor device(s) 110 removably attached to the archway truss device 100.

The archway truss device 100 includes a plurality of vertical support members 112. In some embodiments, the plurality of vertical support members 112 includes two vertical support members defining a single lane of travel through the archway truss device 100. In these embodiments, two vertical support members are spaced a predetermined distance apart which is sufficient to enable at least one user pushing a shopping cart or driving a motorized cart to pass between the two vertical support members of the archway truss device 100 as the user proceeds toward the exit via the lane of travel between the two vertical support members.

In other embodiments, the plurality of vertical support members 112 includes three vertical support members defining two distinct lanes of travel through the archway truss device 100. In still other embodiments, the archway truss device 100 includes four vertical support members defining three lanes of travel through the archway truss device 100. In still other embodiments, the archway truss device 100 includes five or more vertical support members defining four or more lanes of travel through the archway truss device.

Each vertical support member in the plurality of vertical support members 112 includes a frame 114 and a covering 116 over the frame. Each vertical support member connects to the horizontal top member 102 at a connection point 118. The connection point 118 is located at a top portion of each vertical support member.

Figure 5:
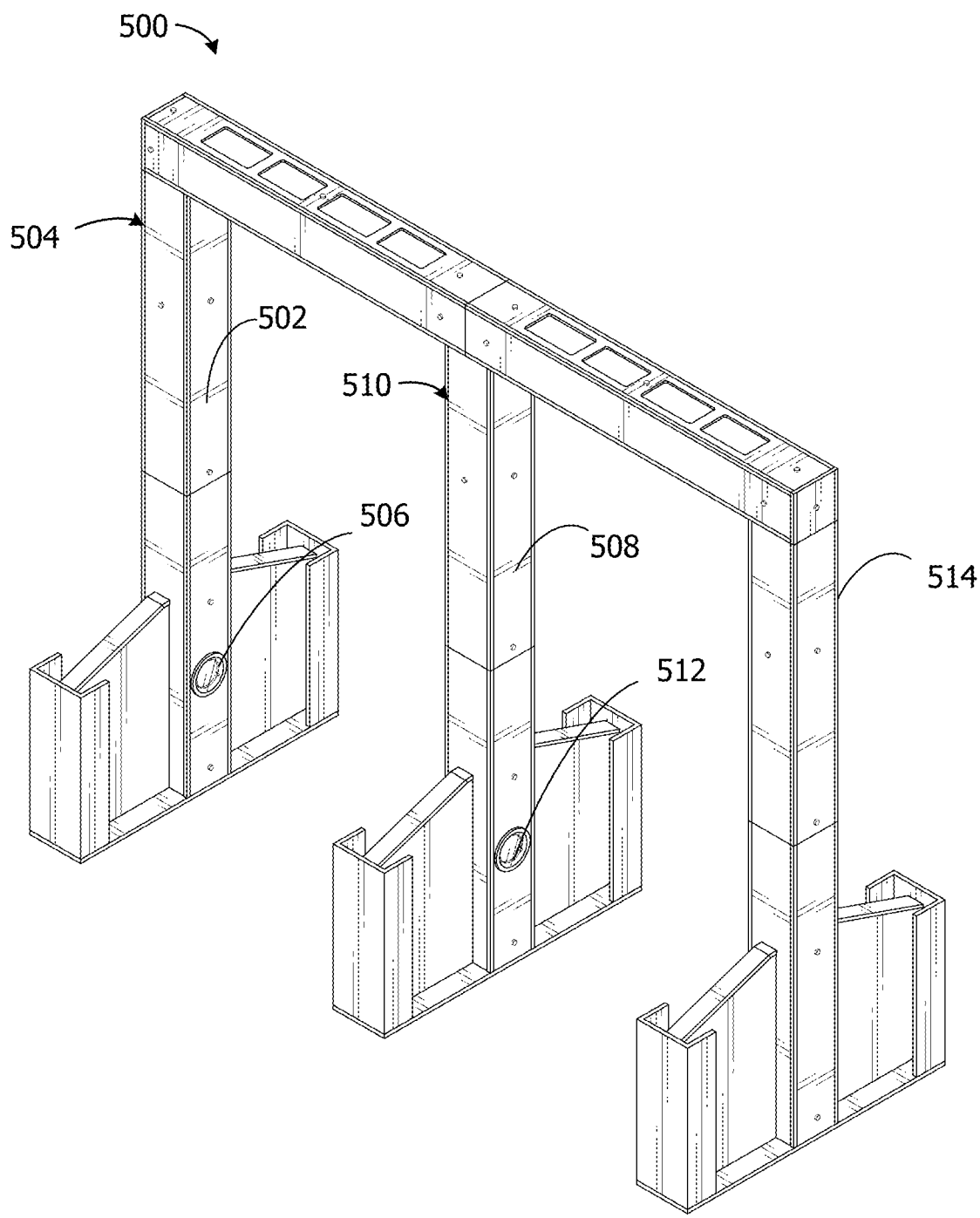
FIG. 5 is an exemplary diagram illustrating a perspective view of a multi-lane archway truss having a plurality of barrier members.
Figure 14:
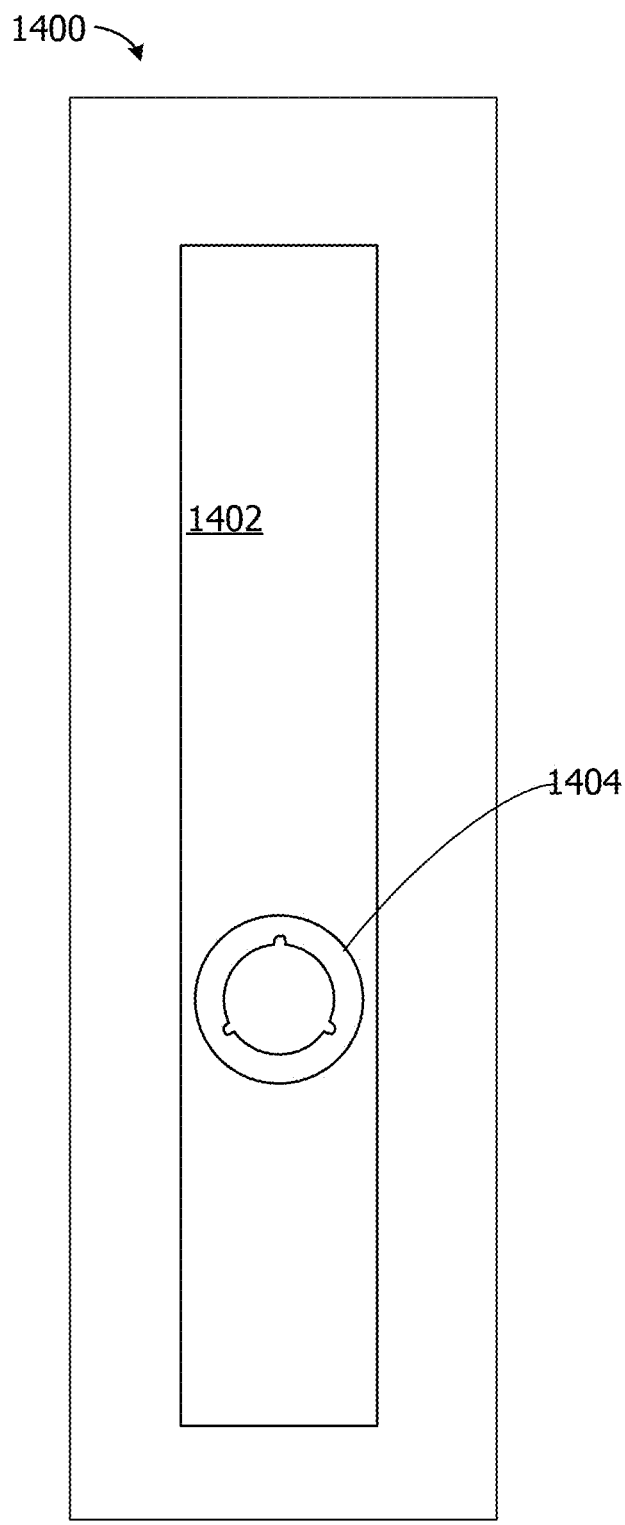
FIG. 14 is an exemplary diagram illustrating an interior side of a vertical support member having a recessed camera housing.

A camera housing 120 is recessed within each vertical support member. The camera housing 120 is sized to encompass an image capture device, such as a camera, as shown in FIG. 5 and FIG. 14 below.

Each vertical support member in the plurality of vertical support members 112 optionally includes one or more pieces of padding, such as, but not limited to, the padding 122. The padding 122 is any type of padding for cushioning the frame 114 in case a user comes into contact with the vertical support member. The padding 122 can include fabric padding, foam padding, cardboard padding, an air-filled padding, or any other type of padding.

The plurality of vertical support members 112, in other embodiments, includes one or more reinforcement members 124. A reinforcement member is a reinforcing material or substance designed to protect the archway truss device 100 from impacts with motorized shopping carts or other heavy objects. The reinforcement members 124 enable the archway truss device 100 to remain intact and stable if a cart strikes a vertical support member in the plurality of vertical support members 112.

The archway truss device 100 includes a plurality of barrier members 126 positioned perpendicular to the front facing and the back facing of the archway truss device 100. Each barrier member includes a pair of wing panels, such as the wing panels 128. One wing panel in the pair of wing panels is attached to a front face of a vertical support member. The second wing panel in the pair of wing panels is attached to a back face of the same vertical support member. A barrier member optionally includes padding 130 around at least a portion of an exterior of the barrier member to provide protection to users from accidental contact with the barrier member. The padding 130 can be implemented as cardboard, fabric, foam, or any other material to cushion hard surfaces, corners, and/or edges of the barrier.

The archway truss device 100 provides support for a plurality of sensor devices 110. The plurality of sensor devices 110 includes one or more image capture device(s) 108 and/or one or more radio frequency identification (RFID) tag reader(s) 134. The image capture device(s) 108 includes any type of device for generating images of objects, such as, but not limited to, a digital camera and/or an infrared (IR) camera. The RFID tag reader(s) 134 include any type of device for detecting RFID signals from one or more RFID tags. The plurality of sensor devices 110 are removably mounted to the archway truss device 100.

In still other embodiments, the archway truss device 100 includes one or more digital display device(s) 136. A digital display device in the digital display device(s) 136 is a device having a display screen for displaying content to a user, such as, but not limited to, still images and/or video content. The content can include text as well as images. In other embodiments, the digital display device(s) 136 include speakers for outputting audio content to users. In still other embodiments, the digital display device(s) 136 include one or more touch screens enabling users to provide input to a computing system, such as to make selections from one or more options provided via the digital display screen.

In some embodiments, the digital display device(s) 136 includes one or more display screens mounted to at least a portion of a front facing of the archway truss device 100 such that users approaching the archway truss device 100 as they move away from a checkout area and towards an exit area can view content displayed on the digital display device(s) 136.

In other embodiments, the digital display device(s) 136 includes one or more display screens mounted to at least a portion of a back facing of the archway truss device 100 such that users exiting the archway truss device 100 and approaching the exit area can view content displayed on the digital display device(s) 136 if they turn their heads or look behind them. Other uses entering through a main entrance adjacent to the exit can also view content displayed on the one or more digital display device(s) 136 mounted to the back facing of the archway truss device 100.

In still other embodiments, the archway truss device 100 includes digital display devices mounted to both the front facing and the back facing of the archway truss device. In still other embodiments, one or more digital display devices in the digital display device(s) 136 are mounted to portions of the front facing of the archway truss device, portions of one or more side facings of the archway truss device, and/or portions of the back facing of the archway truss device 100.

Figure 17:
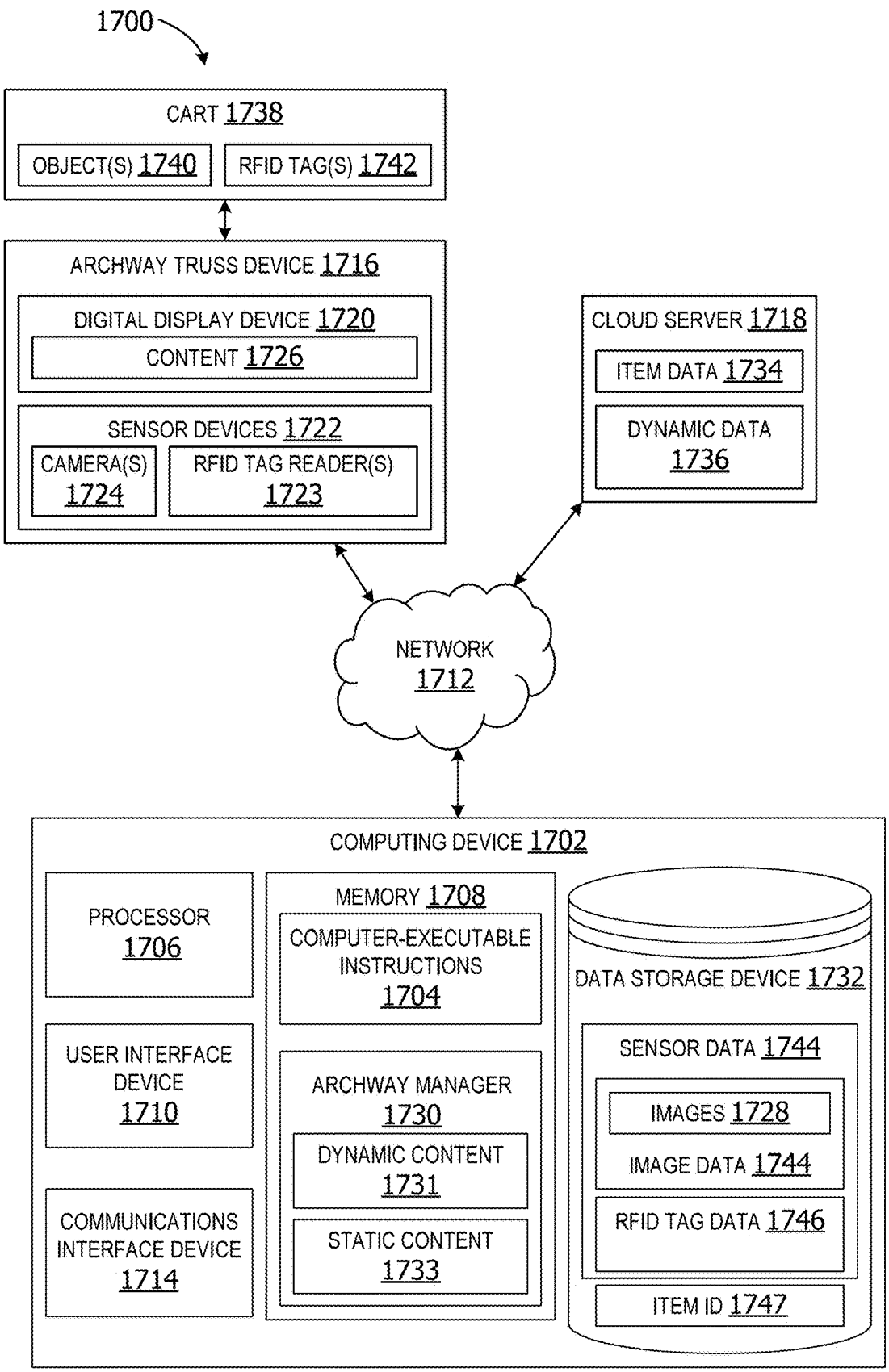
FIG. 17 is an exemplary block diagram illustrating a system for an interactive multi-lane archway truss displaying customizable content to users while generating sensor data associated with objects moving towards an exit.

The digital display device(s) 136 in some embodiments includes a processor, a memory, and/or a communications interface device enabling the digital display device(s) 136 to receive content from a computing device and/or a cloud server, as shown in FIG. 17 below. The digital display device(s) 136 optionally also receive input from users via one or more touch screens associated with the digital display device(s) 136. In some embodiments, the digital display device(s) 136 optionally transmits user inputs to the computing device and/or cloud server.

Figure 2:
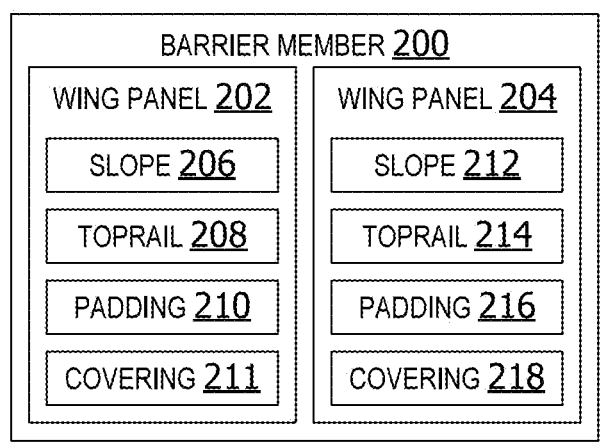
FIG. 2 is an exemplary block diagram illustrating a barrier member for blocking a field of view (FOV) of a set of cameras from objects outside an exit lane of the archway truss.

FIG. 2 is an exemplary block diagram illustrating a barrier member 200 for blocking a field of view (FOV) of a set of cameras from objects outside an exit lane of the archway truss. The barrier member 200 is a barrier attached to a vertical support member of an archway truss, such as, but not limited to, a barrier in the plurality of barrier members 126 in FIG. 1.

The barrier member 200 includes a pair of wing panels, such as, but not limited to, the wing panel 202 and wing panel 204. The wing panel 202 has a slope 206 such that the top rail 208 of the wing panel slopes downward and away from the vertical support member. The wing panel 202 optionally includes padding 210 and/or a covering 211 over an internal frame of the wing panel.

The wing panel 204 also includes a slop 212 such that a top rail 214 slopes downward away from the vertical support member. The wing panel 204 optionally includes padding 216 and/or a covering 218 over an internal frame of the wing panel 204.

Figure 3:
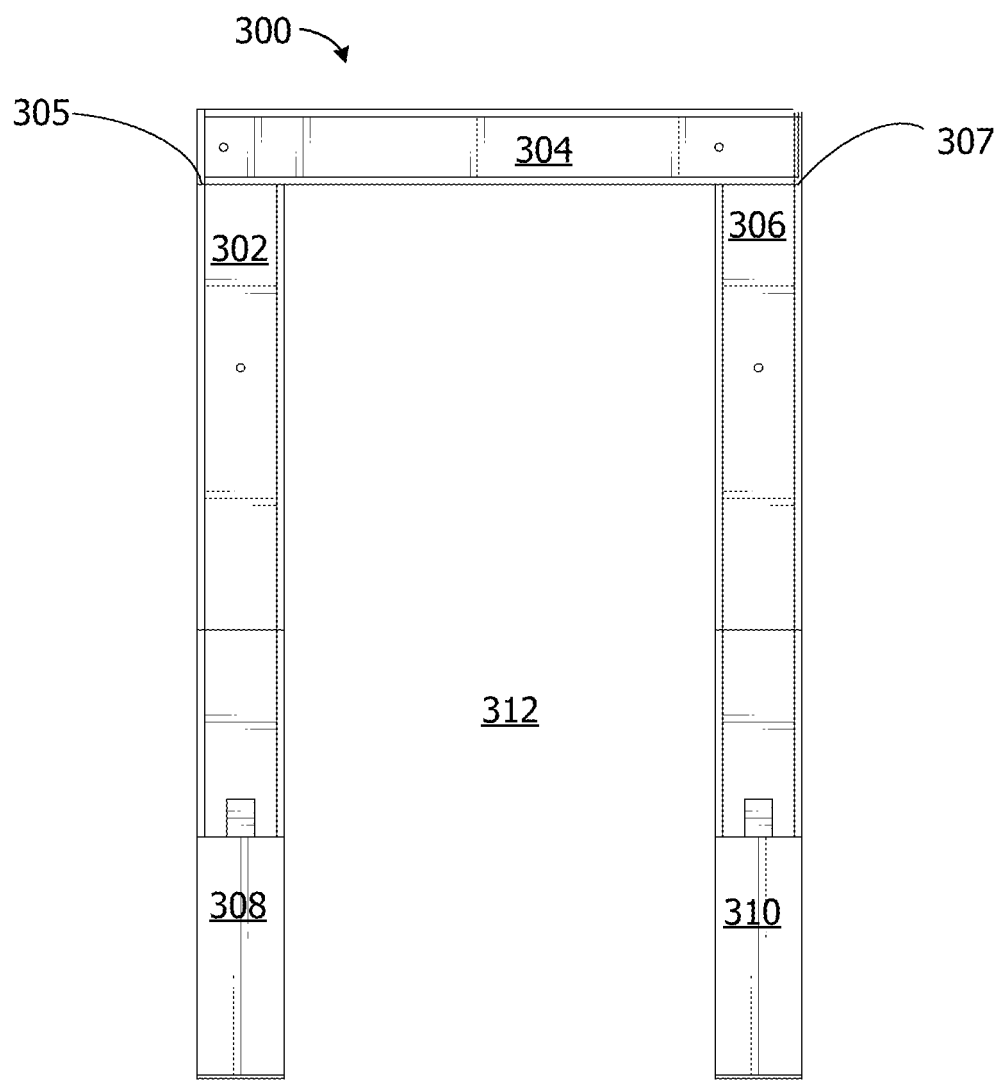
FIG. 3 is an exemplary diagram illustrating a single lane archway truss having a pair of barriers.

Referring now to FIG. 3, an exemplary diagram illustrating a single lane archway truss 300 having a pair of barriers is shown. The archway truss 300 is a device for supporting a plurality of sensor devices, such as, but not limited to, the archway truss device 100 in FIG. 1. In this example, a first vertical support member 302 is attached to a horizontal top member 304 at a first connection point 305. A second vertical support member 306 is attached to the horizontal top member 304 at a second connection point 307.

The first vertical support member 302 includes a barrier member. In this non-limiting example, one wing panel 308 of the barrier member is visible. The second vertical support member 306 includes a barrier member. In this example, one wing panel 310 of the barrier member attached to the second vertical support member 306 is visible. The first vertical support member 302 and the second vertical support member 306 define a lane 312 of travel beneath the arch. The first vertical support member 302 and the second vertical support member 306 are spaced apart a pre-defined distance sufficient to enable a single user pushing a cart, carrying a basket, or riding in a motorized cart to pass through the archway between the vertical support members of the archway truss 300.

In this example, only two vertical support members are provided to create a single lane of travel through the archway truss. However, the embodiments are not limited to only two vertical support members. In other embodiments, the archway truss 300 includes three or more vertical support members, as shown in FIG. 4, FIG. 5, FIG. 6, FIG. 7, and FIG. 8 below.

Figure 4:
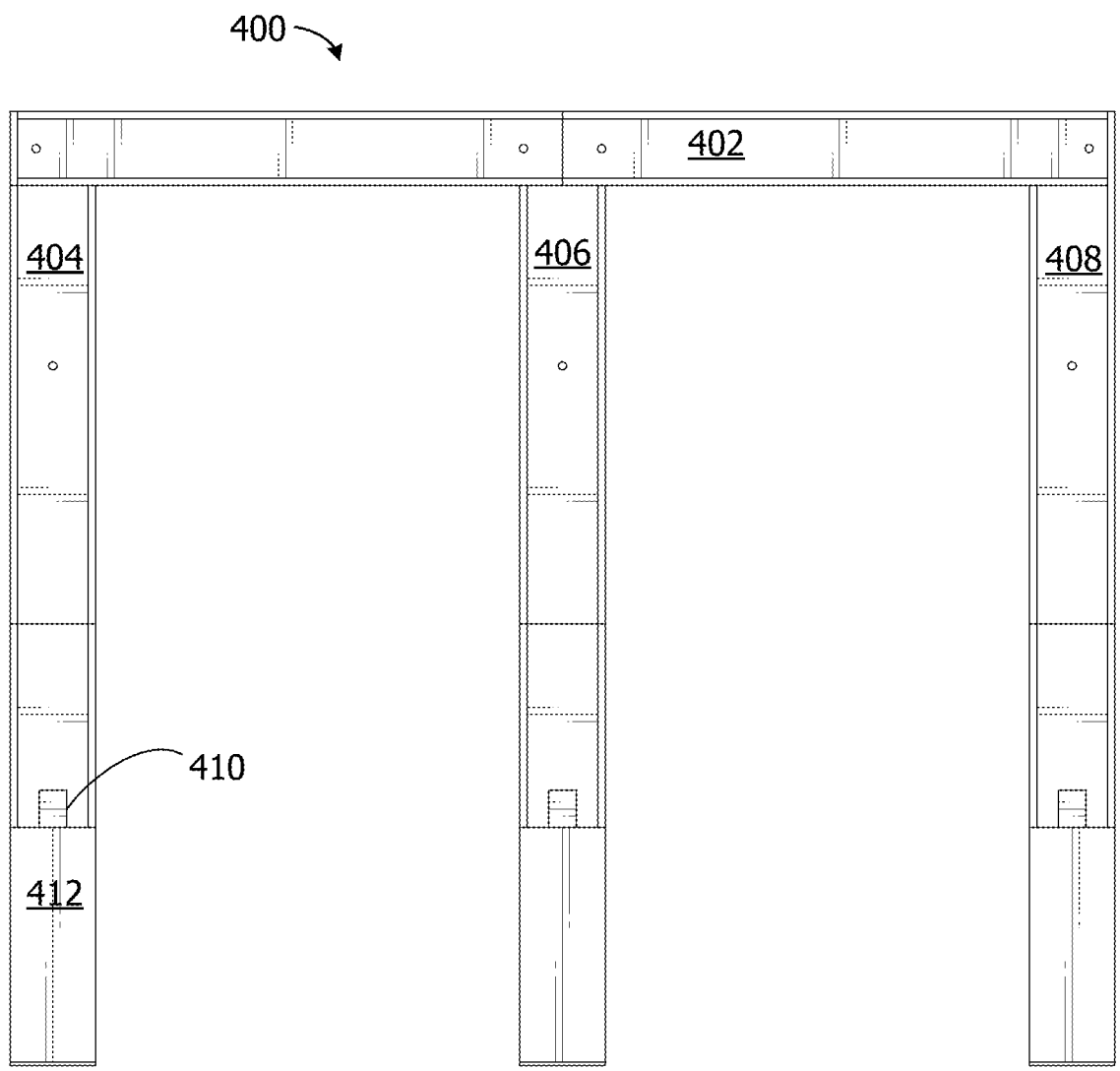
FIG. 4 is an exemplary diagram illustrating a front view of a multi-lane archway truss having a plurality of barrier members.

FIG. 4 is an exemplary diagram illustrating a front view of a multi-lane archway truss 400 having a plurality of barrier members. The archway truss 400 is a device for supporting a plurality of sensor devices, such as, but not limited to, the archway truss device 100 in FIG. 1.

The multi-lane archway truss 400 includes three vertical support members, a left side vertical support member 404, a central support member 406, and a right side vertical support member 408. The central support member 406 is a vertical support member positioned between two other vertical support members. The central support member optionally includes additional reinforcement to protect the central support member against collisions from carts.

The left side vertical support member 404, a portion of the horizontal top member 402 and the central support member 406 form a first lane of travel through the archway. The central support member 406, a second portion of the horizontal top member 402 and the right side vertical support member 408 form a second lane of travel through the archway.

Each vertical support member in this example includes a barrier member. A wing panel of each barrier member is visible. For example, the wing panel 412 of the right side vertical support member is visible in FIG. 4. The wing panel 412 includes a sloping top rail 410, such as, but not limited to, the sloping top rail 208 and/or the sloping top rail 214 in FIG. 2.

FIG. 5 is an exemplary diagram illustrating a perspective view of a multi-lane archway truss 500 having a plurality of barrier members. In this example, the multi-lane archway truss 500 includes three vertical support members with a horizontal top member forming two lanes or passageways through the archway. In this example, each lane is associated with a checkout device, such as a point-of-sale (POS) device, a self-checkout (SCO) device or other checkout terminal. For example, one lane is associated with a first checkout terminal while the second lane is associated with a second checkout such that a user completing checkout at the first terminal exits via the first lane and a different user checking out at the second terminal exits via the second lane.

In some embodiments, the multi-lane archway truss 500 includes one or more recessed camera housings within one or more vertical support members. In this example, an interior side 502 of a first vertical support member 504 includes a recessed camera housing 506. A camera is placed inside the recessed camera housing 506. The camera captures images of a side and/or bottom of a cart, such as a shopping cart, motorized cart or basket carried by a user moving through a first lane defined by the first vertical support member 504 and the central support member 510.

Likewise, an interior side 508 of the central support member 510 also includes another recessed camera housing 512 for a camera. The camera inside the recessed camera housing 512 captures images of a side and/or bottom of a cart moving through the second lane defined by the central support member 504 and a second vertical support member 514.

In other embodiments, the central support member 510 includes two recessed camera housings. The recessed camera housing 512 is located on a first side of the central support member 510 facing toward the second vertical support member 514, such that the camera in the recessed camera housing can capture images of objects in the second lane. A second recessed camera housing (not shown) is located on an opposite side of the central support member facing toward the first vertical support member 504 sch that a camera in the second recessed camera housing can capture images of objects moving through the first lane.

In these embodiments, the images captured by the image capture devices are not intended to capture images of human users. Any images having human users or other objects which are not of interest inadvertently included within the images are removed from the images by cropping the images such that only objects of interest remain in the cropped images. Images of users or objects which are not of interest are deleted or otherwise discarded. The cropped images containing only the objects of interest are then analyzed to identify and label the objects of interest within the cropped images.

Figure 6:
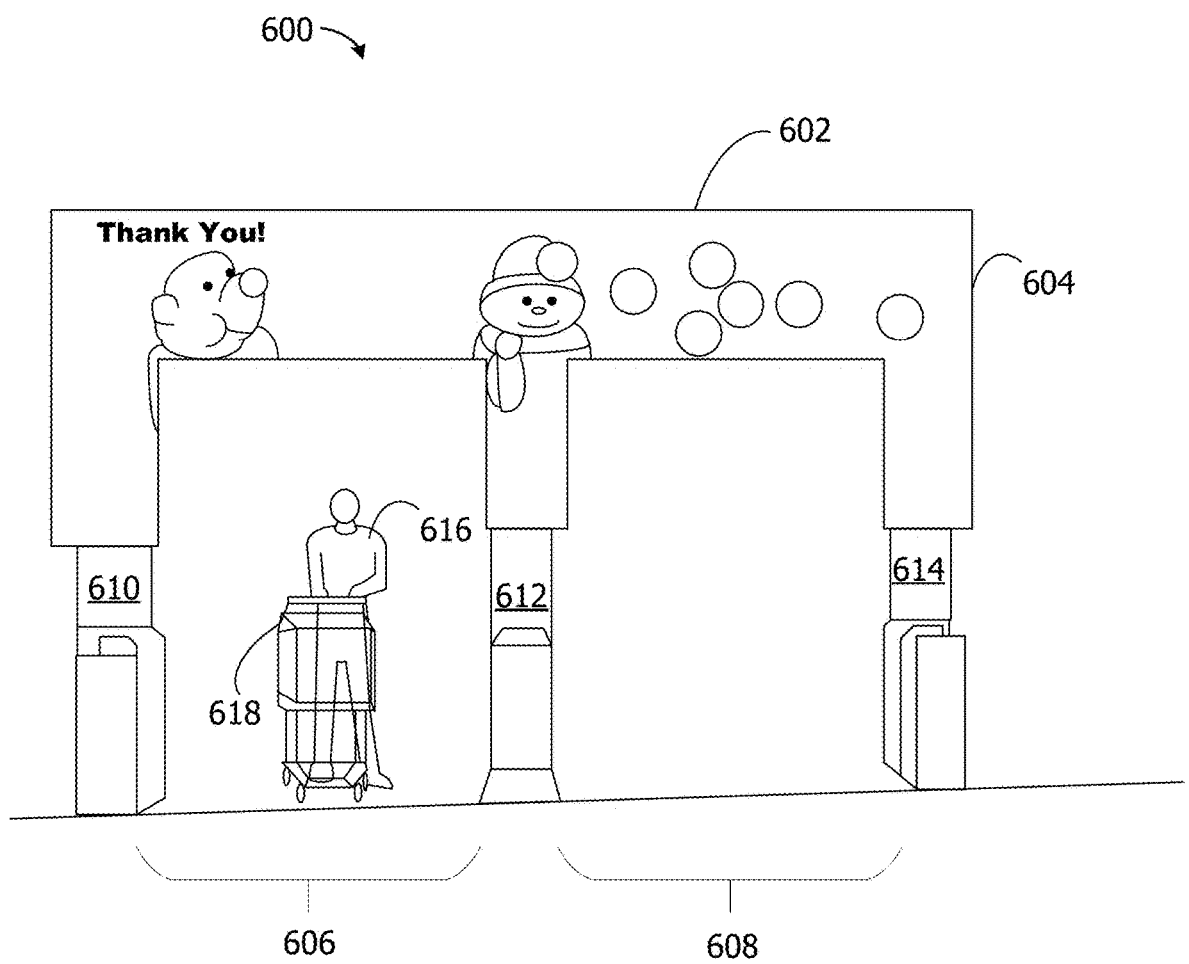
FIG. 6 is an exemplary diagram illustrating a multi-lane archway truss having a digital display device.

FIG. 6 is an exemplary diagram illustrating a multi-lane archway truss 600 having a digital display device 602. The multi-lane archway truss 600 is an archway truss device, such as, but not limited to, the archway truss device 100 in FIG. 1. In this example, the multi-lane archway truss 600 defines a first lane 606 and a second lane 608. The digital display device 602 is a device for displaying video content, such as, but not limited to, the digital display device(s) 136 in FIG. 1. The digital content includes still images, digital video, and/or audio content.

The first lane is defined by the first vertical support member 610, a portion of the horizontal top member, and the central support member 612. The second lane 608 is defined by the central support member 612, a portion of the horizontal top member, and the second vertical support member 614. In this non-limiting example, a user 616 pushes a cart 618 from a checkout terminal through the first lane 606 as the user 616 moves towards an exit.

In this example, the digital display device 602 is located on a top portion of the multi-lane archway truss 600. The digital display device 602 covers all of the horizontal top member as well as a top portion of each vertical support member. However, the embodiments are not limited to a single digital display device. In other examples, the digital display device 602 includes two or more digital display devices attached to one or more locations on the multi-lane archway truss. Likewise, the digital display device is not limited to covering all of the horizontal top members and/or only a portion of the vertical support members. In other examples, a screen of the digital display device covers only a portion of the horizontal top member. In still other embodiments, the digital display device covers all of one or more of the vertical support members.

In this example, the digital display device 602 is located on a back facing side 604 of the multi-lane archway truss. However, in other embodiments, the digital display device is attached to the opposite (front facing) side of the multi-lane archway truss 600.

The multi-lane archway truss 600 includes a plurality of sensor devices, such as cameras, which capture data associated with objects in the cart 618 as the user 616 moves through the first lane 606 of the multi-lane archway truss 600. For example, a camera within a recessed camera housing of the first vertical support member, a camera mounted to a portion of the horizontal top member above the first lane 606 and a camera mounted within another recessed camera housing of the central support member 612 captures multiple images of the objects in the cart from multiple different angles as the user 616 moves through the archway without requiring the user to pause or stop as they exit the retail facility. Other sensor devices, such as RFID tag readers, barcode readers, or other sensor devices capture additional item identification data as the user 616 moves through the archway.

Figure 7:
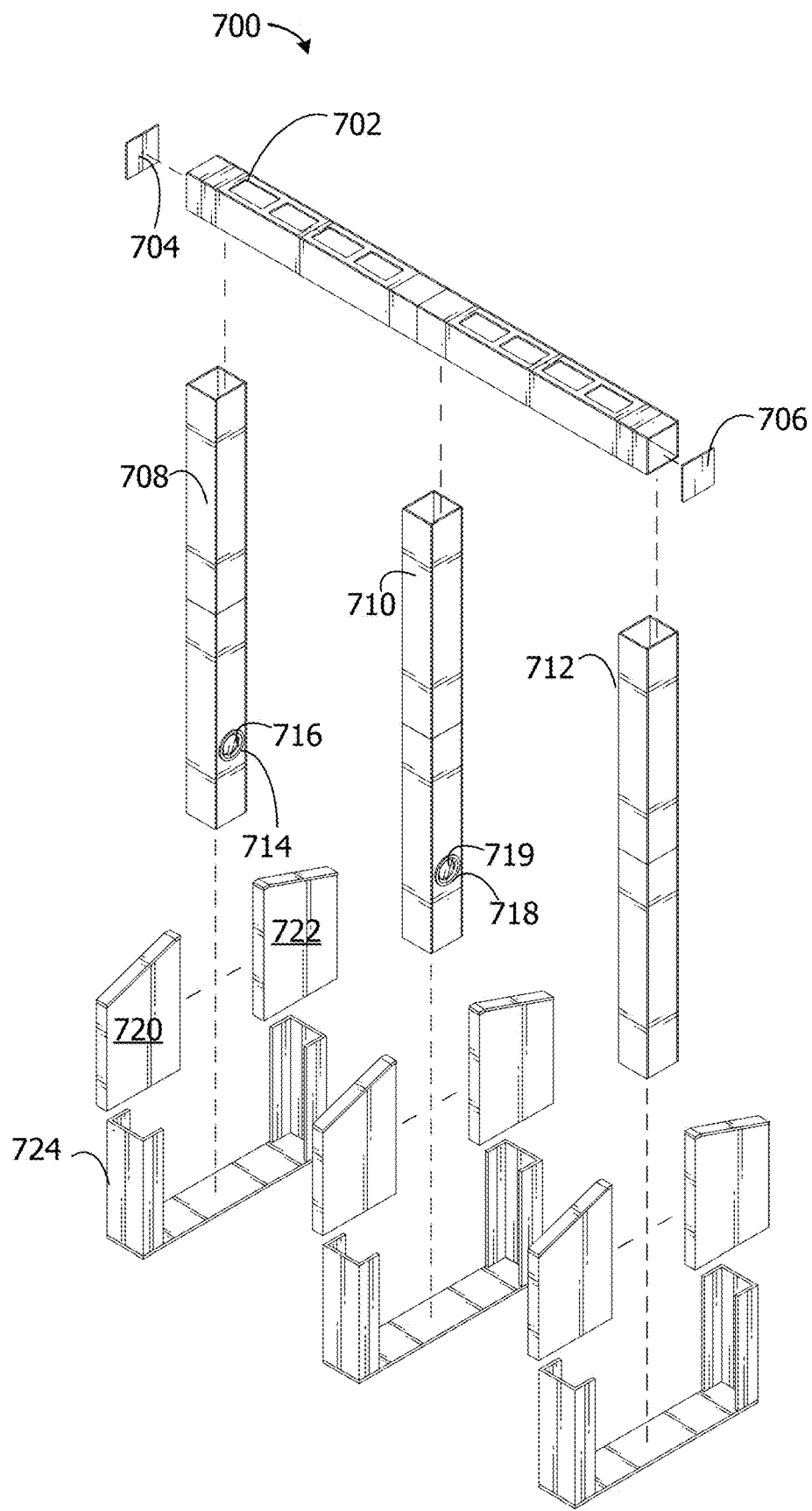
FIG. 7 is an exemplary diagram illustrating an exploded view of a multi-lane archway truss having a plurality of barrier members.

FIG. 7 is an exemplary diagram illustrating an exploded view of a multi-lane archway truss 700 having a plurality of barrier members. The multi-lane archway truss 700 in some embodiments includes a horizontal top member frame 702 and a cover, such as the end cap covering 704 and end cap covering 706.

In other embodiments, the multi-lane archway truss 700 includes a plurality of vertical support members, such as, but not limited to, the plurality of vertical support members 112 in FIG. 1. In this example, the plurality of vertical support members includes a first vertical support member 708, a second vertical support member 710, and a third vertical support member 712. The second vertical support member 710 can also be referred to as a central support member.

Each vertical support member includes at least one camera housing. In this example, the first vertical support member 708 includes a recessed camera housing 714 partially recessed within a frame of the first vertical support member 708. The recessed camera housing 714 at least partially encloses a camera 716 associated with an interior side of the first vertical support member 708. The second vertical support member 710, in this example, includes a recessed camera housing 718 associated with an interior (inward facing) side of the second vertical support member 710. The recessed camera housing 718 partially encloses a camera 719.

Each vertical support member includes a barrier member. In this example, a first barrier member associated with the first vertical support member 708 includes a first wing panel 720 and a second wing panel 722. The pair of wing panels sit within a base member 724. The pair of wing panels, including the first wing panel 720 and the second wing panel 722, with the base member forms a first barrier member of the first vertical support member.

Figure 8:
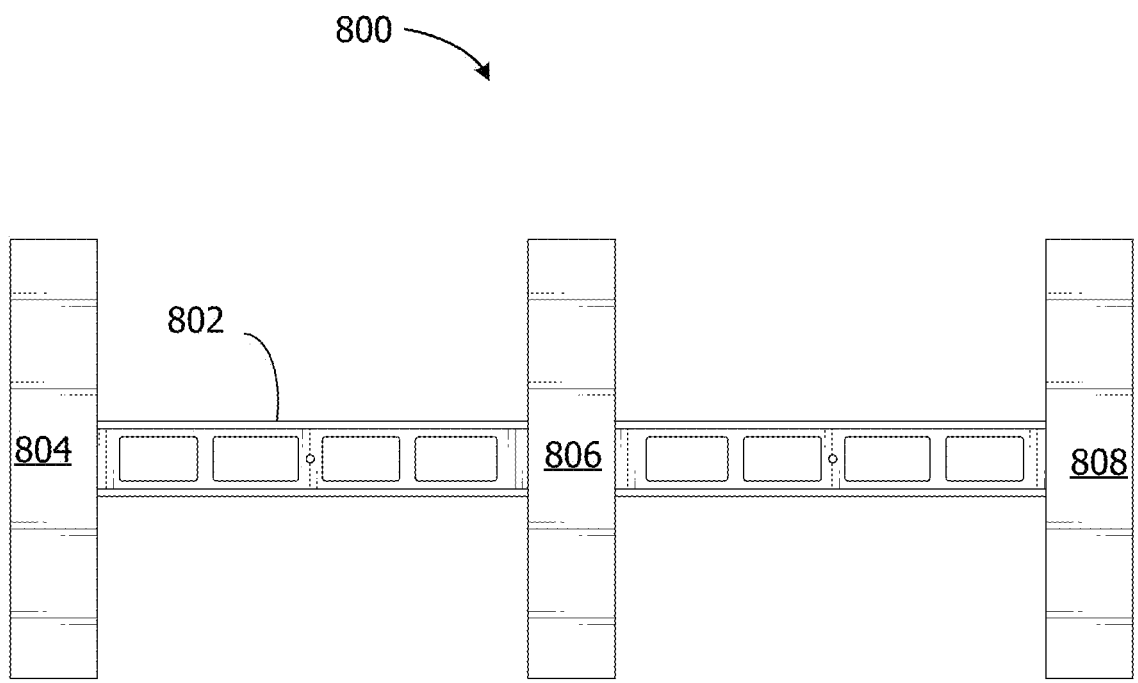
FIG. 8 is an exemplary diagram illustrating a top view of the multi-lane archway truss having a plurality of barrier members.

FIG. 8 is an exemplary diagram illustrating a top view of the multi-lane archway truss 800 having a plurality of barrier members. In this example, a horizontal top member 802. A plurality of barrier members associated with the multi-lane archway truss 800 includes a first barrier member 804, a second barrier member 806, and a third barrier member 808.

Figure 9:
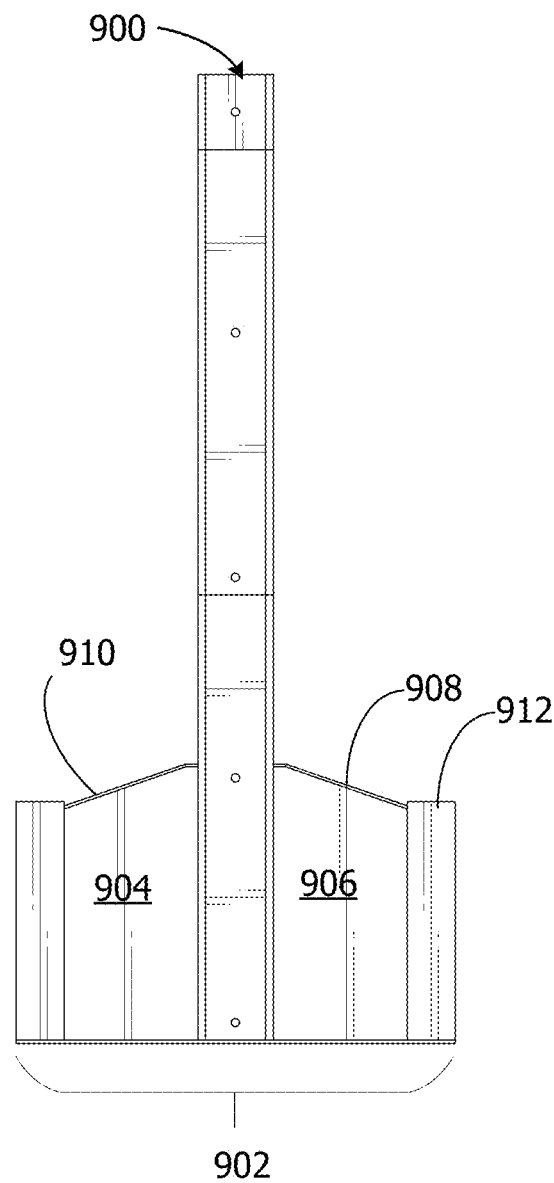
FIG. 9 is an exemplary diagram illustrating an exterior side of a vertical support member having a barrier member.

FIG. 9 is an exemplary diagram illustrating an exterior side of a vertical support member 900 having a barrier member 902. The barrier member 902 includes a first wing panel 904 and a second wing panel 906 forming a pair of wing panels. Each wing panel includes a sloping top rail, such as, but not limited to, the sloping top rail 908 of the second wing panel 906 and the sloping top rail 910 associated with the first wing panel 904. The pair of wing panels both sit within a base member 912.

Figure 10:
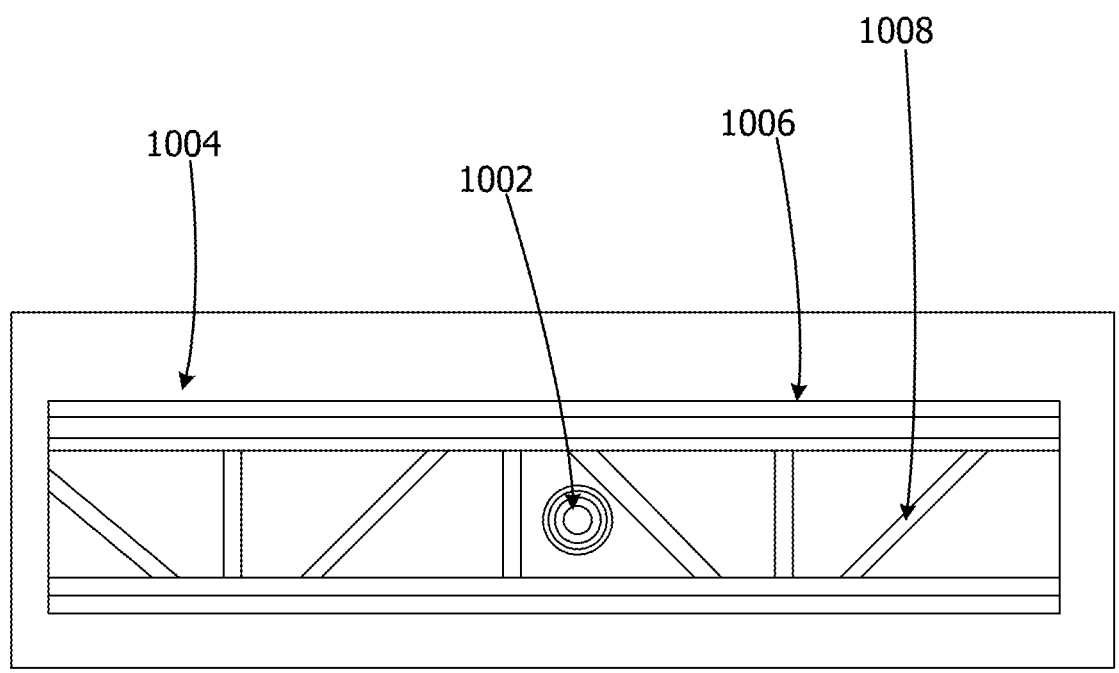
FIG. 10 is an exemplary diagram illustrating a camera mounted to a horizontal top member.

Turning now to FIG. 10, an exemplary diagram illustrating a camera 1002 mounted to a horizontal top member 1004 is shown. The camera 1002 is mounted to a frame 1008 of the horizontal top member 1004 via a mounting bracket, in this example. The frame 1008 is at least partially covered with a covering 1006.

Figure 11:
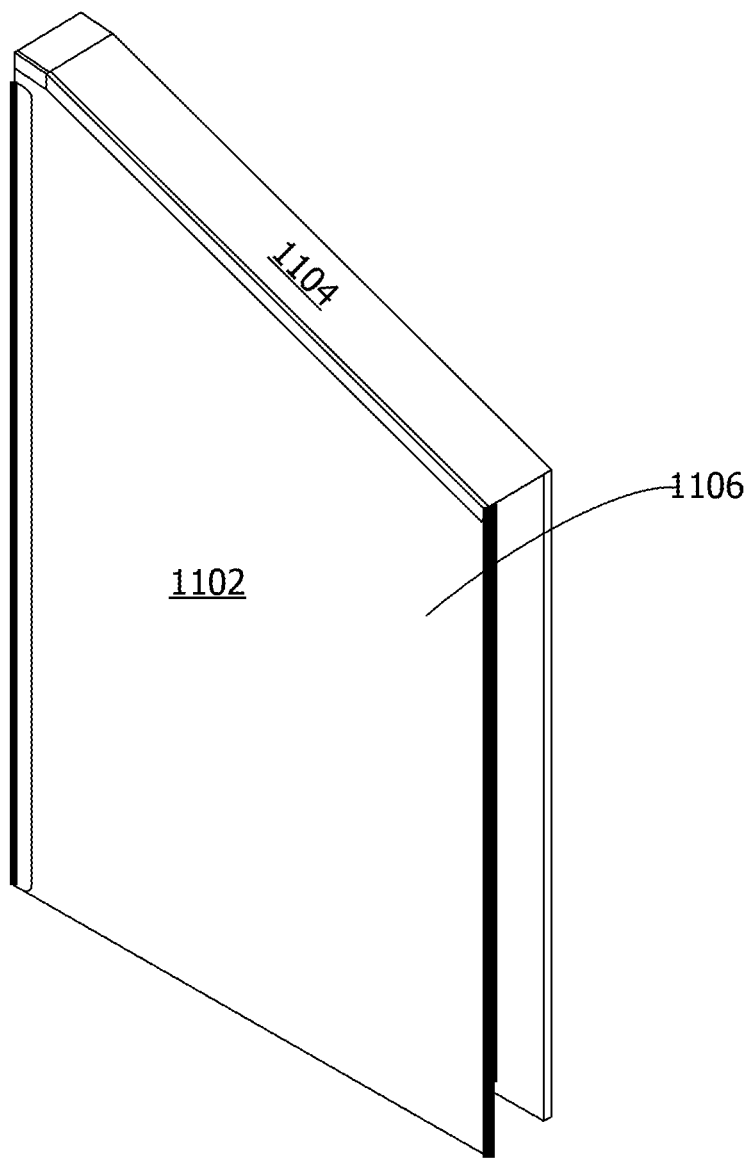
FIG. 11 is an exemplary diagram illustrating a wing panel having a sloping top edge.

FIG. 11 is an exemplary diagram illustrating a wing panel 1102 having a sloping top edge 1104. The wing panel optionally includes padding or other material within an interior of the wing panel and/or on an exterior surface of the wing panel to provide protection to users coming into contact with the wing panel. In this example, the interior frame of the wing panel is not visible due to a covering 1106 over the frame.

Figure 12:
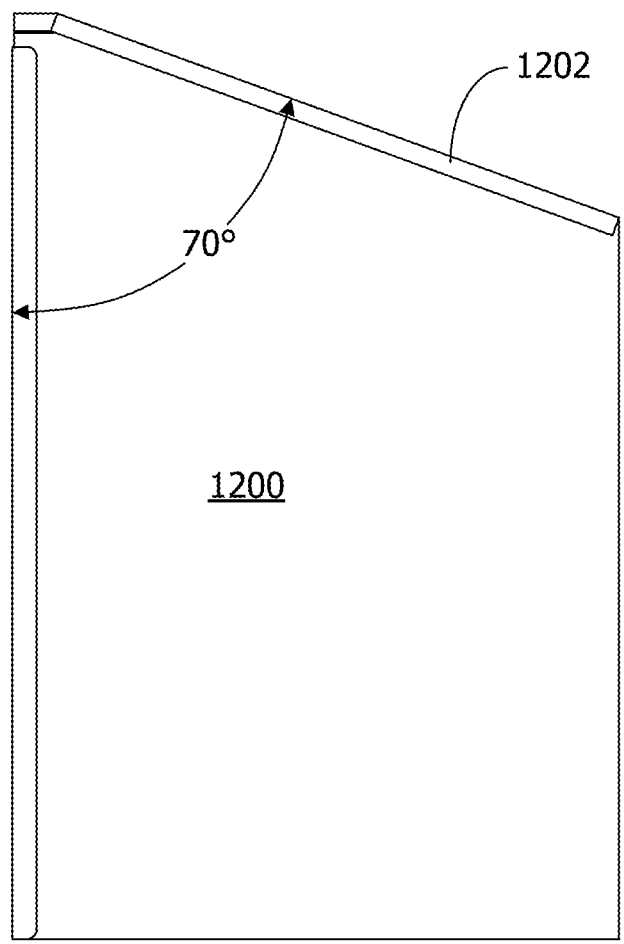
FIG. 12 is an exemplary diagram illustrating a side view of a wing panel having a sloping top rail.

FIG. 12 is an exemplary diagram illustrating a side view of a wing panel 1200 having a sloping top rail 1202. In this example, there is a seventy degree angle associated with the top rail forming the downward slope of the wing panel. However, the embodiments are not limited to a wing panel having a seventy degree angle at the top corner to form a slope. In other embodiments, the angle may be greater than shown in FIG. 12 or less than the angle shown in FIG. 12.

Figure 13:
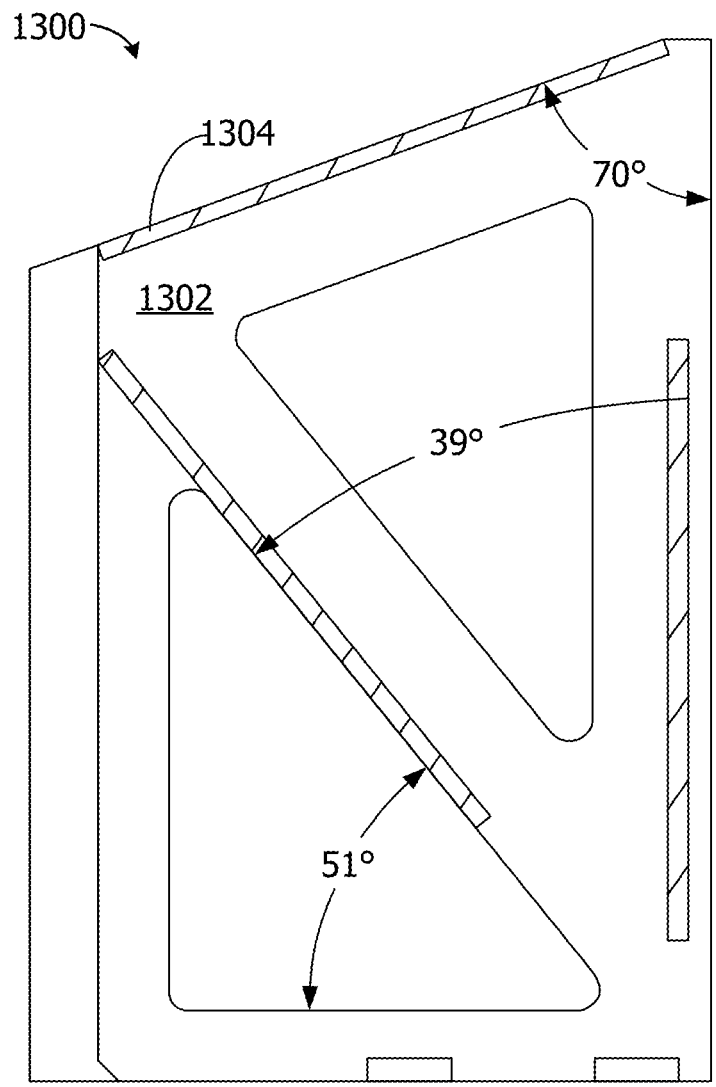
FIG. 13 is an exemplary diagram illustrating a side view of a wing panel frame without an exterior covering.

FIG. 13 is an exemplary diagram illustrating a side view of a wing panel 1300 frame 1302 without an exterior covering. The top rail 1304 of the wing panel 1300 has a downward slope, in this non-limiting example. However, in other embodiments, the top rail of the wing panel is substantially level and does not have a slope. In still other examples, the top rail has an upward slope instead of a downward slope.

FIG. 14 is an exemplary diagram illustrating an interior side 1402 of a vertical support member 1400 having a recessed camera housing 1404. In this example, the camera housing is recessed within the vertical support member. However, in other embodiments, the camera housing is not completely recessed within the vertical support member.

Instead, the camera housing at least partially protrudes outside the vertical support member.

Figure 15:
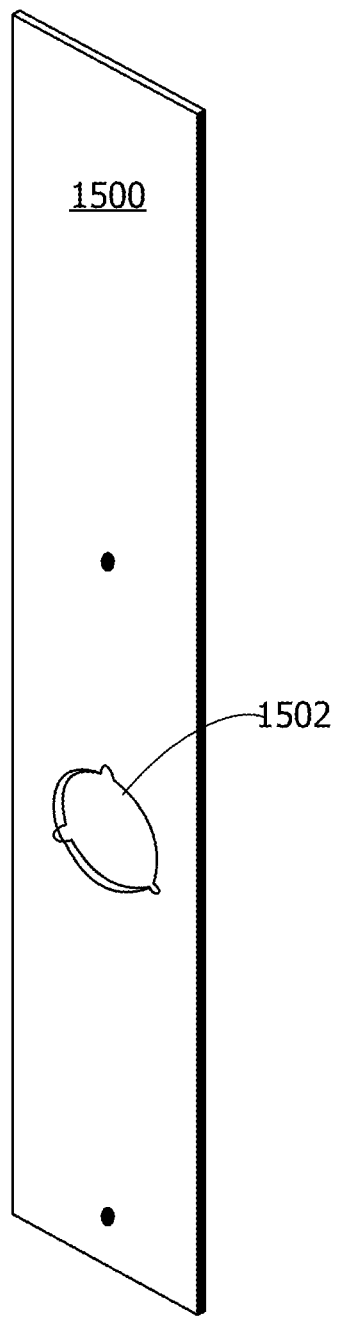
FIG. 15 is an exemplary diagram illustrating an exterior covering for a vertical support member including an aperture for a camera housing.

FIG. 15 is an exemplary diagram illustrating an exterior covering 1500 for a vertical support member including an aperture 1502 for a camera housing. The aperture is a substantially round opening to accommodate the FOV of a camera within a recessed camera housing of the vertical support member. However, the embodiments are not limited to a round aperture. In other embodiments, the recessed camera housing has a square aperture, a rectangular aperture, an oval shaped aperture, or any other shape.

Figure 16:
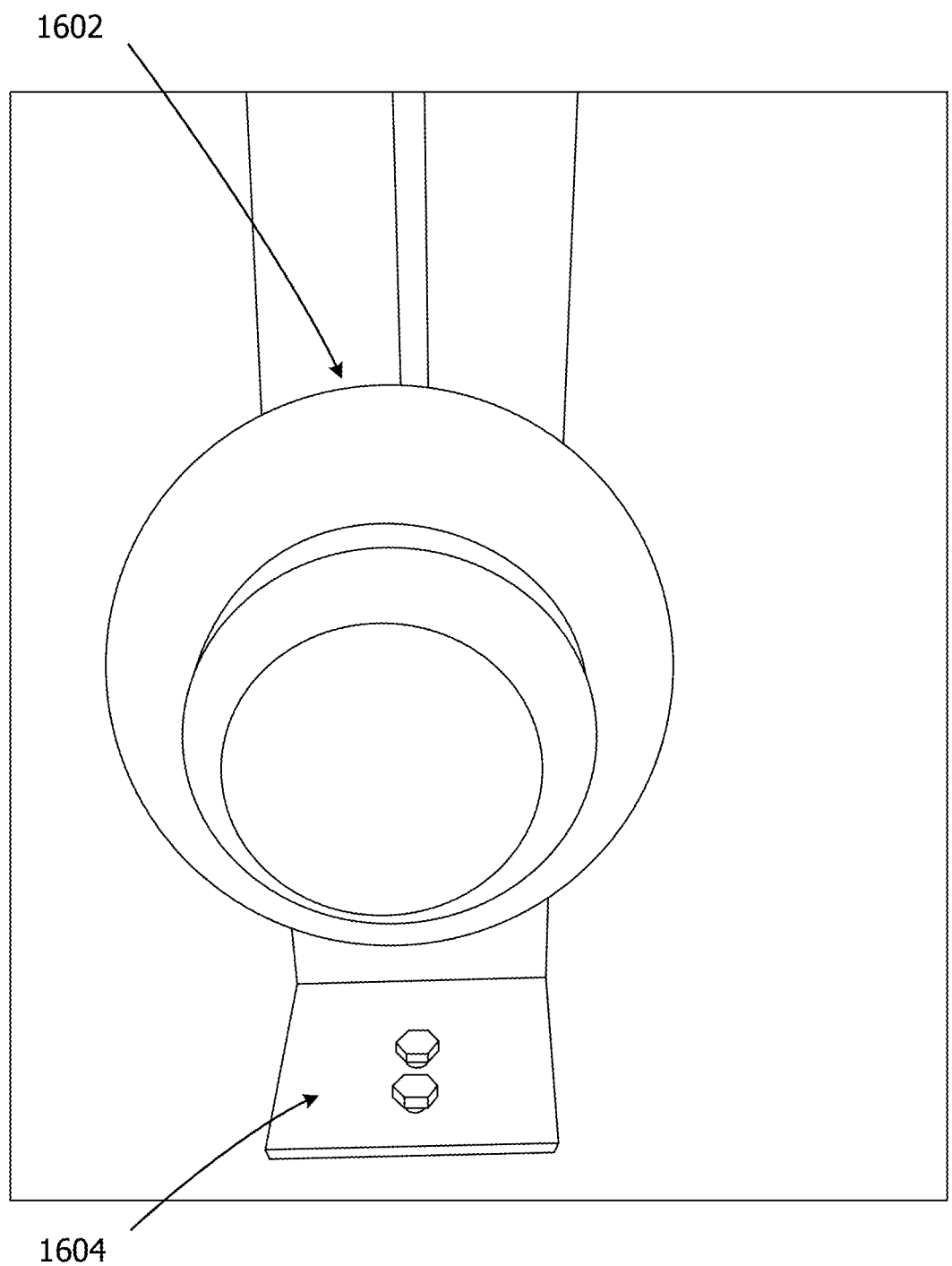
FIG. 16 is an exemplary diagram illustrating a camera mounted to a horizontal top member via a mounting bracket.

FIG. 16 is an exemplary diagram illustrating a camera 1602 mounted to a horizontal top member via a mounting bracket 1604. However, the embodiments are not limited to mounting a camera to a portion of a horizontal top member via a bracket. In other embodiments, the camera is removably attached to a portion of the horizontal top member via a camera housing, a camera socket, or any other device for removably attaching a camera to a frame of a horizontal top member.

FIG. 17 is an exemplary block diagram illustrating a system 1700 for an interactive multi-lane archway truss displaying customizable content to users while generating sensor data associated with objects moving towards an exit. In the example of FIG. 17, the computing device 1702 represents any device executing computer-executable instructions 1704 (e.g., as application programs, operating system functionality, or both) to implement the operations and functionality associated with the computing device 1702.

The computing device 1702, in some examples includes a mobile computing device or any other portable device. A mobile computing device includes, for example but without limitation, a mobile telephone, laptop, tablet, computing pad, netbook, gaming device, and/or portable media player. The computing device 1702 can also include less-portable devices such as servers, desktop personal computers, kiosks, or tabletop devices. Additionally, the computing device 1702 can represent a group of processing units or other computing devices.

In some examples, the computing device 1702 has at least one processor 1706 and a memory 1708. The computing device 1702, in other examples includes a user interface device 1710.

The processor 1706 includes any quantity of processing units and is programmed to execute the computer-executable instructions 1704. The computer-executable instructions 1704 are performed by the processor 1706, performed by multiple processors within the computing device 1702 or performed by a processor external to the computing device 1702. In some examples, the processor 1706 is programmed to execute instructions such as those illustrated in the figures (e.g., FIG. 18).

The computing device 1702 further has one or more computer-readable media such as the memory 1708. The memory 1708 includes any quantity of media associated with or accessible by the computing device 1702. The memory 1708 in these examples is internal to the computing device 1702 (as shown in FIG. 1). In other examples, the memory 1708 is external to the computing device (not shown) or both (not shown). The memory 1708 can include read-only memory and/or memory wired into an analog computing device.

The memory 1708 stores data, such as one or more applications. The applications, when executed by the processor 1706, operate to perform functionality on the computing device 1702. The applications can communicate with counterpart applications or services such as web services accessible via a network 1712. In an example, the applications represent downloaded client-side applications that correspond to server-side services executing in a cloud.

In other examples, the user interface device 1710 includes a graphics card for displaying data to the user and receiving data from the user. The user interface device 1710 can also include computer-executable instructions (e.g., a driver) for operating the graphics card. Further, the user interface device 1710 can include a display (e.g., a touch screen display or natural user interface) and/or computer-executable instructions (e.g., a driver) for operating the display. The user interface device 1710 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 1702 in one or more ways.

The network 1712 is implemented by one or more physical network components, such as, but without limitation, routers, switches, network interface cards (NICs), and other network devices. The network 1712 is any type of network for enabling communications with remote computing devices, such as, but not limited to, a local area network (LAN), a subnet, a wide area network (WAN), a wireless (Wi-Fi) network, or any other type of network. In this example, the network 1712 is a WAN, such as the Internet. However, in other examples, the network 1712 is a local or private LAN.

In some examples, the system 1700 optionally includes a communications interface device 1714. The communications interface device 1714 includes a network interface card and/or computer-executable instructions (e.g., a driver) for operating the network interface card. Communication between the computing device 1702 and other devices, such as but not limited to an archway truss device 1716 and/or a cloud server 1718, can occur using any protocol or mechanism over any wired or wireless connection. In some examples, the communications interface device 1714 is operable with short range communication technologies such as by using near-field communication (NFC) tags.

The archway truss device 1716, the digital display device 1720, and/or the sensor devices 1722 of the archway truss device 1716 includes one or more communications interface devices which enables the archway truss device, the digital display device 1720 and/or a plurality of sensor devices 1722 on the archway truss device 1716 to communicate with the computing device 1702 and/or the cloud server 1718 via the network 1712. In some embodiments, the archway truss device 1716, the digital display device 1720, and/or the sensor devices 1722 includes at least one processor and a memory. The archway truss device 1716 optionally also includes a user interface device, such as a touchscreen or other input/output device associated with the digital display device 1720 or other component of the archway truss device.

The digital display device 1720 is a device for displaying content 1726 via a screen, such as a digital display screen or a touch screen. The digital display device 1720 is optionally implemented as a light emitting diode (LED), liquid crystal display (LCD), cathode ray tube (CRT), or any other type of display screen.

The plurality of sensor devices 1722 is a plurality of devices for gathering data associated with one or more objects passing through the archway truss device 1716. The plurality of sensor devices 1722 includes sensor devices, such as, but not limited to, one or more RFID tag reader(s) 1723 and/or one or more camera(s) 1724 for capturing images 1728 of objects in a cart, such as a shopping cart, a motorized cart, a hand-held basket, or any other type of cart. The RFID tag reader(s) 1723, in some embodiments, generate sensor data 1744, including RFID tag data 1746 obtained from one or more RFID tag(s) 1742 on the one or more object(s) 1740 detected in a cart 1738.

The cloud server 1718 is a logical server providing services to the computing device 1702 or other clients, such as, but not limited to, the digital display device 1720. The cloud server 1718 is hosted and/or delivered via the network 1712. In some non-limiting examples, the cloud server 1718 is associated with one or more physical servers in one or more data centers. In other examples, the cloud server 1718 is associated with a distributed network of servers.

In some examples, the cloud server 1718 stores item data 1734 and/or dynamic data 1736. Item data 1734 is data associated with object(s) 1740 detected in a user cart 1738. The item data 1734 includes an item ID 1747 for each detected object captured in the images 1728 and/or identified using the RFID tag data 1746.

The system 1700 can optionally include a data storage device 132 for storing data, such as, but not limited to sensor data 1744 generated by the plurality of sensor devices 1722 and/or item ID 1747 for the object(s) 1740. The sensor data 1744 includes image data 1744 associated with the images 1728 and/or the RFID tag data 1746. The data storage device 1732 can include one or more different types of data storage devices, such as, for example, one or more rotating disks drives, one or more solid state drives (SSDs), and/or any other type of data storage device. The data storage device 1732 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 1732 includes a database.

The data storage device 1732 in this example is included within the computing device 1702, attached to the computing device, plugged into the computing device, or otherwise associated with the computing device 1702. In other examples, the data storage device 1732 includes a remote data storage accessed by the computing device via the network 1712, such as a remote data storage device, a data storage in a remote data center, or a cloud storage.

The memory 1708 in some examples stores one or more computer-executable components, such as, but not limited to, archway manager 1730. The archway manager component, when executed by the processor 1706 of the computing device 1702, receives the images 1728 from the camera(s) 1724 and stores them as image data 1744 in the data storage device 1732 for use in CV object detection and recognition. The archway manager 1730 generates dynamic content 1731 using dynamic data 1736. The dynamic data 1736 includes seasonal data associated with a season of the year, holidays, weather forecast, current weather conditions, local events, local trends, promotions, themes, instructional information or directions for users, information dissemination, etc. Dynamic data can also include user input, such as user selections of themes or content selected via an application on a user device, selections made via a touch screen, and/or selections made via the computing device 1702.

The system can alternatively select static content 1733. Static content 1733 is any pre-planned or pre-generated content which is presented via the digital display device without regard to dynamic data 1736. The dynamic content 1731 and the static content 1733 includes still images, moving video images and/or audio content.

Figure 18:
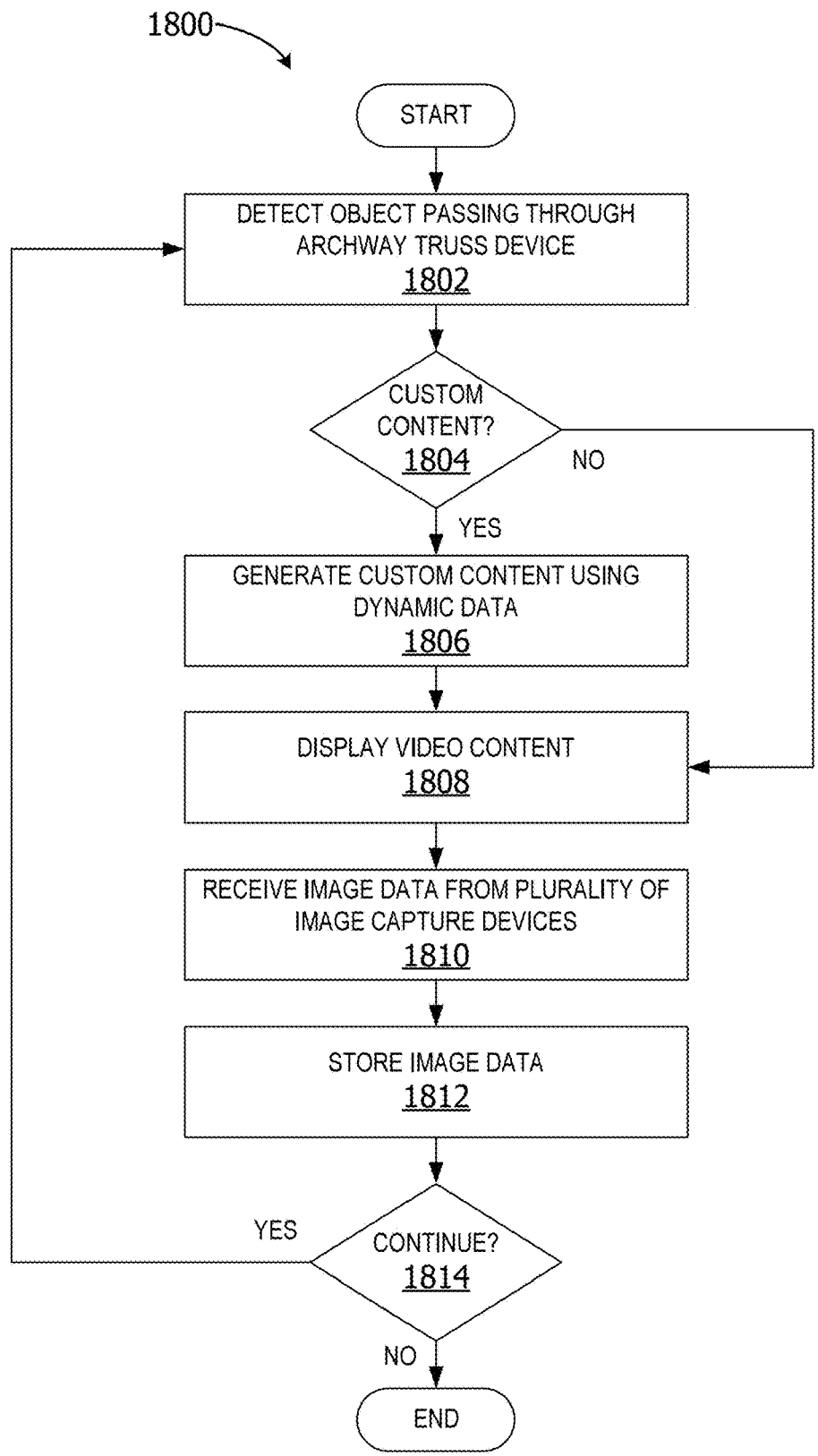
FIG. 18 is an exemplary flow chart illustrating operation of a computing device to generate content for display to a user and receive image data from a plurality of camera devices associated with the archway truss.

FIG. 18 is an exemplary flow chart illustrating operation of a computing device to generate content for display to a user and receive image data from a plurality of camera devices associated with the archway truss. The process 1800 shown in FIG. 18 is performed by an archway manager, executing on a computing device, such as the computing device 1702 in FIG. 17.

The process begins by detecting one or more objects passing through the archway truss device at 1802. The objects are detected by a plurality of sensor devices, such as, but not limited to, the plurality of sensor devices 110 in FIG. 1. A determination is made whether the generate custom content for presentation to the user via a digital display device at 1804. If yes, customized content is generated using dynamic data at 1806. The content includes video content, such as still images or moving video images. The video content optionally includes audio content. The video content is displayed at 1808. The content is displayed via a digital display device, such as, but not limited to, the digital display device(s) 136 in FIG. 1. Image data is received from a plurality of image capture devices at 1810. The image capture devices are devices for capturing images of objects passing through the archway truss, such as, but not limited to, the plurality of image capture device(s) 108 in FIG. 1. The image data is stored at 1812. The image data is stored in a data storage device, such as, but not limited to, the data storage device 1732 in FIG. 17. A determination is made whether to continue at 1814. If yes, the process iteratively executes operations 1802 through 1812 until a determination is made not to continue at 1814. The process terminates thereafter.

While the operations illustrated in FIG. 18 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 18.

Additional Examples

In some examples, as customers exit a retail facility after having paid for their products, the archway truss is installed as at least two exit lanes. Sensor devices, such as cameras, are installed on the archway such that the cameras are able to capture all different angle of the customer's products whilst maintaining the ability to detect and recognize products passing through the arch in a shopping cart. Furthermore, the archway truss is installed and positioned between checkout terminals and the exits so as to control traffic, provide a structure for hanging cameras and RFID tag readers, and be able to withstand the force of physical collisions from carts and flatbeds passing through the arch. The barrier also reduces false positives by preventing erroneous attribution of objects in the background to the contents of a cart passing through the archway.

The cameras, in some embodiments, are positioned and calibrated to capture images of carts and objects in carts from multiple angles. This enables the system to generate high quality images of items. High quality images enables more accurate CV results using the images.

The archway truss, in other embodiments, includes recessed camera housing. The housings are recessed partially within the vertical support members to protect the cameras from impacts, tampering, damage or contacts which could move the cameras out of their ideal placement and result in the need to re-position and/or recalibrate the cameras.

In some embodiments, the distance from the archway truss to the store exit is sufficient to enable the requisite processing time to analyze the sensor data associated with the passing customer's cart contents, and provide a recommendation regarding the cart to the exit greeter. The recommendation includes a recommendation that all items in the cart were correctly scanned and/or appear on the receipt. Another recommendation includes a recommendation to scan one or more items in the cart to verify the cart contents. In some examples, the archway truss provides at least two lanes where each lane includes at least three cameras. The three cameras include a top camera mounted to the horizontal top member, and two bottom cameras mounted to each vertical support member in a pair of vertical support members.

In some embodiments, the top camera is positioned so that the camera is a couple of inches off of the center of the horizontal top rail in the truss. The guard on the camera is pointed away from the exit.

In other embodiments, to effectively block the neighboring lane, the central support member barrier should measure either 3×5 or 4×5 feet on each side, with a total length of 3×10 or 4×10 feet. The central barrier blocks objects in the adjacent lane more effectively than other methods such as background removal. To mitigate the impact of objects on the two sides, a combination of the side barrier and background removal algorithm can be employed. When two carts are detected in an image, the system employs a depth model to differentiate the two carts in the image.

Some examples provide a two-way passage architecture archway-metal truss having a top (horizontal) member, a right side (vertical) member, a left side (vertical member), and a middle (vertical) central barrier forming two lanes through which shopping carts can pass. The truss has at least six cameras mounted on the truss. There are three cameras mounted such that they capture images from multiple angles of a first cart passing through the first lane. There are at least three cameras mounted to the archway such that the cameras capture images of a second cart passing through the second lane from multiple angles. A camera mounted to the top of the truss, a camera mounted at the bottom/right side and a camera mounted at the bottom left side of the truss to capture images from multiple directions/angles of the shopping cart and cart contents (products in the cart) as the cart passes through. The archway truss is positioned between the checkout and the exit.

Other sensor devices are optionally mounted to the truss, such as, but not limited to, RFID sensors, barcode readers, Bluetooth, NFC, or other sensor devices to read tags, barcodes, and other identifiers on the products within the cart. A plurality of image capture devices mounted to an archway truss exit lane are able to capture images of a shopping cart and products in the cart from multiple angles as the customer exits. A top member of the archway truss having a top camera mounted to it and pointing downward captures a "bird's eye view"/top view image of the shopping cart. A right side member of the archway truss having a bottom mounted camera directed toward a first side of the first shopping cart in the first lane captures side view images of the cart and cart contents. A central barrier member of the archway truss having a bottom mounted camera directed towards a second side of the first shopping cart in the first lane captures opposite side view images of the cart and cart contents. A second top member camera mounted to the top member of the archway truss that is pointing downward captures top view images of a second shopping cart in a second exit lane. A left side member of the truss having a camera mounted to a bottom portion of the side member and positioned captures images of the side of the second shopping cart in the second lane.

Having a balanced number of cameras mounted to the archway truss enables the system to capture images of shopping carts and cart contents adjusted to maximize efficiency. Two way passage architecture with a central barrier blocks the view of cameras in the first lane from capturing images in the second lane. The central barrier also blocks the view of cameras in the second lane from capturing images of carts in the first lane.

Alternatively, or in addition to the other examples described herein, examples include any combination of the following:
  a set of image capture devices removably attached to the archway truss, the set of image capture devices;
  a first image capture device removably attached to the first vertical support member, wherein the first image capture device is located within a first recessed camera housing of the first vertical support member;
  a second image capture device removably attached to the second vertical support member, wherein the second image capture device is located within a second recessed camera housing of the second vertical support member;
  a third image capture device removably attached to the horizontal top member and positioned between the first vertical support member and the second vertical support member, wherein the first image capture device, the second image capture device and the third image capture device are positioned to capture a first set of images of a first set of objects moving through the first lane;
  a fourth image capture device removably attached to the horizontal top member between the second vertical support member and the third vertical support member;
  a fifth image capture device removably attached to the second vertical support member, wherein the fifth image capture device is located within a third recessed camera housing of the second vertical support member;
  a sixth image capture device removably attached to the third vertical support member, wherein the sixth image capture device is located within a fourth recessed camera housing of the third vertical support member, and wherein the fourth image capture device, the fifth image capture device and the sixth image capture device are positioned to capture a second set of images of a second set of objects moving through the second lane;
  a barrier member associated with a vertical support member, the barrier member comprising a pair of the wing panels, each wing panel extending perpendicular to the vertical support member;
  a set of radio frequency identification (RFID) reader devices removably attached to the archway truss;
  a set of reinforced panels covering an exterior surface of the second vertical support member, wherein the second vertical support member is reinforced to withstand collisions of one or more carts with the second vertical support member;
digital display device associated with a front facing side of the archway truss device, wherein the digital display device displays content viewable by users passing through the first lane;
digital display device associated with a back facing side of the archway truss device, wherein the digital display device displays dynamic content;
a first wing panel of a barrier attached to a front side of a vertical support member, the first wing panel sloping downward away from the vertical support member;
a second wing panel of the barrier attached to a back side of the vertical support member, the second wing panel sloping downward away from the vertical support member;
a multi-lane archway truss forming two lanes of travel through the archway;
a multi-lane archway truss forming three lanes of travel through the archway;
a reinforced central support member disposed between a first vertical support member and a second vertical support member;
a set of image capture devices removably attached to the archway truss generating images of the objects passing through the first lane and the second lane;
the set of RFID tag readers generating sensor data associated with the objects passing through the first lane and the second lane of the archway truss;
a first image capture device removably attached to the first vertical support member, wherein the first image capture device is at least partially recessed within the first vertical support member;
a second image capture device removably attached to the central support member, wherein the second image capture device is at least partially recessed within the central support member; and
a third image capture device removably attached to the horizontal top member and positioned between the first vertical support member and the central support member, wherein the first image capture device, the second image capture device and the third image capture device are positioned to capture a first set of images of a first set of objects moving through the first lane;
a first downward sloping top rail of the first side panel; and
a second downward sloping top rail of the second side panel, wherein the first side panel and the second side panel are positioned to block any objects outside the first lane from a field of view of at least one image capture device within the set of image capture devices;
a first metal frame within the first vertical support member covered by a first padded exterior covering;
a second metal fame within the second vertical support member covered by a second padded exterior covering;
a third metal fame within the central support member covered by a third padded exterior covering;
a digital display device at least partially covering at least one side of the archway truss device, wherein the digital display device displays content viewable by users passing through the first lane and the second lane;
a third vertical support member attached to the horizontal top member, wherein a third lane of travel is formed between the third vertical support member and the second vertical support member;
a third set of image capture devices positioned to capture images of objects passing through the third lane of travel;
a first vertical support member connected to a first connection point of a horizontal top member;
a second vertical support member connected to a second connection point of the horizontal top member, the first vertical support member, a first portion of the horizontal top member, and the second vertical support member forming a first lane for passage of carts through the archway truss device;
a second barrier attached to the second vertical support member, wherein the first barrier and the second barrier provide a screen preventing the first set of cameras from capturing images of objects outside the first lane;
a third vertical support member connected to a third connection point of the horizontal top member, the second vertical support member, a second portion of the horizontal top member, and the third vertical support member forming a second lane for a second set of carts to pass through the archway truss device;
a second set of cameras removably attached to the archway truss, the second set of cameras comprising a third bottom camera associated with the second vertical support member, a fourth bottom camera associated with the third vertical support member, and a second top camera associated with the horizontal top member, the second set of cameras positioned to capture images of a second set of objects passing through the second lane;
a third barrier attached to the third vertical support member, wherein the second barrier and the third barrier provide a screen preventing the second set of cameras from capturing images of objects outside the second lane;
a digital display device removably attached to the archway truss device, the digital display device covering at least a portion of a front facing side of the archway truss device, wherein the digital display device displays customizable content viewable by users passing through the first lane and the second lane;
the first barrier comprising a first wing panel attached to a bottom portion of the front facing side of the first vertical support member and a second wing panel attached to a bottom portion of a back facing side of the first vertical support member;
the second barrier comprising third wing panel attached to a bottom portion of the front facing side of the second vertical support member and a fourth wing panel attached to a bottom portion of a back facing side of the second vertical support member; and
the third barrier comprising a fifth wing panel attached to a bottom portion of the front facing side of the third vertical support member and a sixth wing panel attached to a bottom portion of a back facing side of the third vertical support member.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17, or an entity (e.g., processor 1706, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17.

In some examples, the operations illustrated in FIG. 18 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing an archway truss device, the method comprising detecting objects in a cart; generating dynamic content for display via a digital display device, and store sensor data generated by sensor devices on the archway truss device.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing an interactive multi-lane archway truss device. For example, the elements illustrated in FIG. 17, such as when encoded to perform the operations illustrated in FIG. 18, constitute exemplary means for detecting objects in a cart, exemplary means for generating video content for display on a digital display device, and exemplary means for generating and storing sensor data associated with objects passing through the interactive multi-lane archway truss device.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or" as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than "B"); in another embodiment, to B only (optionally including elements other than "A"); in yet another embodiment, to both "A" and "B" (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of 'A' and 'B'" (or, equivalently, "at least one of 'A' or 'B'," or, equivalently "at least one of 'A' and/or 'B'") can refer, in one embodiment, to at least one, optionally including more than one, "A", with no "B" present (and optionally including elements other than "B"); in another embodiment, to at least one, optionally including more than one, "B", with no "A" present (and optionally including elements other than "A"); in yet another embodiment, to at least one, optionally including more than one, "A", and at least one, optionally including more than one, "B" (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An archway truss providing support for a plurality of sensor devices, the archway truss comprising:
   a first vertical support member forming a first side of a first lane;
   a second vertical support member forming a second side of the first lane;
   a horizontal top member connected to a first connection point of the first vertical support member and a second connection point of the second vertical support member forming an arch associated with the first lane;
   a first barrier member removably attached to the first vertical support member, the first barrier member comprising a first pair of wing panels extending perpendicular to the first vertical support member;
   a second barrier member associated with the second vertical support member, the second barrier member comprising a second pair of the wing panels extending perpendicular to the second vertical support member; and
   the plurality of sensor devices removably attached to the arch, the plurality of sensor devices generating sensor data associated with an object passing through the first lane of the arch.

2. The archway truss of claim 1, the plurality of sensor devices comprising:
   a set of image capture devices removably attached to the archway truss, the set of image capture devices comprising:
   a first image capture device removably attached to the first vertical support member, wherein the first image capture device is located within a first recessed camera housing of the first vertical support member;
   a second image capture device removably attached to the second vertical support member, wherein the second image capture device is located within a second recessed camera housing of the second vertical support member; and
   a third image capture device removably attached to the horizontal top member and positioned between the first vertical support member and the second vertical support member, wherein the first image capture device, the second image capture device and the third image capture device are positioned to capture a first set of images of a first set of objects moving through the first lane.

3. The archway truss of claim 1, further comprising:
   a third vertical support member, wherein the third vertical support member is connected to the horizontal top member, wherein the second vertical support member, a portion of the horizontal top member, and the third vertical support member form a second arch defining a second lane; and
   a third barrier member associated with the third vertical support member, the third barrier member comprising a third pair of the wing panels, each wing panel in the third pair of the wing panels extending perpendicular to the third vertical support member.

4. The archway truss of claim 3, wherein the plurality of sensor devices further comprises:
   a fourth image capture device removably attached to the horizontal top member between the second vertical support member and the third vertical support member;
   a fifth image capture device removably attached to the second vertical support member, wherein the fifth image capture device is located within a third recessed camera housing of the second vertical support member; and a sixth image capture device removably attached to the third vertical support member, wherein the sixth image capture device is located within a fourth recessed camera housing of the third vertical support member, and wherein the fourth image capture device, the fifth image capture device and the sixth image capture device are positioned to capture a second set of images of a second set of objects moving through the second lane.

5. The archway truss of claim 1, wherein the plurality of sensor devices further comprises:
a set of radio frequency identification (RFID) reader devices removably attached to the archway truss.

6. The archway truss of claim 1, further comprising:
a set of reinforced panels covering an exterior surface of the second vertical support member, wherein the second vertical support member is reinforced to withstand collisions of one or more carts with the second vertical support member.

7. The archway truss of claim 1, further comprising:
a digital display device associated with a front facing side of the archway truss device, wherein the digital display device displays content viewable by users passing through the first lane.

8. The archway truss of claim 1, further comprising:
digital display device associated with a back facing side of the archway truss device, wherein the digital display device dynamically displays content viewable from an exit.

9. The archway truss of claim 1, further comprising:
a first wing panel of the first barrier attached to a first front side of the first vertical support member, the first wing panel sloping downward away from the first vertical support member;
a second wing panel of the first barrier attached to a first back side of the first vertical support member, the second wing panel sloping downward away from the first vertical support member;
a third wing panel of the second barrier attached to a second front side of the second vertical support member, the first wing panel sloping downward away from the second vertical support member; and
a fourth wing panel of the second barrier attached to a second back side of the second vertical support member, the fourth wing panel sloping downward away from the second vertical support member.

10. A multi-lane archway truss comprising:
a first vertical support member;
a first barrier associated with the first vertical support member, the first barrier comprising a first side panel attached to a first front side of the first vertical support member and a second side panel attached to a first back side of the first vertical support member;
a second vertical support member;
a second barrier associated with the second vertical support member, the second barrier comprising a third side panel attached to a second front side of the second vertical support member and a fourth side panel attached to a second back side of the second vertical support member;
a central support member disposed between the first vertical support member and the second vertical support member;
a third barrier associated with the central support member, the third barrier comprising a fifth side panel attached to a third front side of the central support member and a sixth side panel attached to a third back side of the central support member;
a horizontal top member attached to a first connection point of the first vertical support member, a second connection point of the second vertical support member, and a third connection point of the central support member, wherein a first lane is provided between the first vertical support member and the central support member, and wherein a second lane is provided between the second vertical support member and the central support member;
a set of image capture devices removably attached to the multi-lane archway truss generating images of an object passing through the first lane and the second lane; and
a set of RFID tag readers removably attached to the multi-lane archway truss, the set of RFID tag readers generating sensor data associated with the object passing through the first lane and the second lane of the multi-lane archway truss.

11. The multi-lane archway truss of claim 10, wherein the set of image capture devices further comprises:
a first image capture device removably attached to the first vertical support member, wherein the first image capture device is at least partially recessed within the first vertical support member;
a second image capture device removably attached to the central support member, wherein the second image capture device is at least partially recessed within the central support member; and
a third image capture device removably attached to the horizontal top member and positioned between the first vertical support member and the central support member, wherein the first image capture device, the second image capture device and the third image capture device are positioned to capture a first set of images of a first set of objects moving through the first lane.

12. The multi-lane archway truss of claim 11, further comprising:
a fourth image capture device removably attached to the horizontal top member and positioned between the second vertical support member and the central support member;
a fifth image capture device removably attached to the central support member; and
a sixth image capture device removably attached to the second vertical support member, wherein the fifth image capture device is at least partially recessed within the second vertical support member, and wherein the fourth image capture device, the fifth image capture device and the sixth image capture device are positioned to capture a second set of images of a second set of objects moving through the second lane.

13. The multi-lane archway truss of claim 10, wherein the first barrier further comprises:
a first downward sloping top rail of the first side panel; and
a second downward sloping top rail of the second side panel, wherein the first side panel and the second side panel are positioned to block objects outside the first lane from a field of view of at least one image capture device within the set of image capture devices.

14. The multi-lane archway truss of claim 10, further comprising:
  a first metal frame within the first vertical support member covered by a first padded exterior covering;
  a second metal fame within the second vertical support member covered by a second padded exterior covering; and
  a third metal fame within the central support member covered by a third padded exterior covering.

15. The multi-lane archway truss of claim 10, further comprising:
  digital display device at least partially covering a front facing side of the multi-lane archway truss device, wherein the digital display device displays content viewable by users passing through the first lane and the second lane.

16. The multi-lane archway truss of claim 10, further comprising:
  a third vertical support member attached to the horizontal top member, wherein a third lane of travel is formed between the third vertical support member and the second vertical support member; and
  a third set of image capture devices positioned to capture images of a third set of objects passing through the third lane of travel.

17. An interactive multi-lane archway truss device comprising:
  a first vertical support member connected to a first connection point of a horizontal top member;
  a first barrier attached to the first vertical support member;
  a second vertical support member connected to a second connection point of the horizontal top member, the first vertical support member, a first portion of the horizontal top member, and the second vertical support member forming a first lane for passage of carts through the interactive multi-lane archway truss device;
  a first set of cameras removably attached to the interactive multi-lane archway truss, the first set of cameras comprising a first bottom camera associated with the first vertical support member, a second bottom camera associated with the second vertical support member, and a first top camera associated with the horizontal top member, the first set of cameras positioned to capture images of a first object passing through the first lane;
  a second barrier attached to the second vertical support member, wherein the first barrier and the second barrier provide a screen preventing the first set of cameras from capturing images of objects outside the first lane;
  a third vertical support member connected to a third connection point of the horizontal top member, the second vertical support member, a second portion of the horizontal top member, and the third vertical support member forming a second lane for a second set of carts to pass through the interactive multi-lane archway truss device;
  a second set of cameras removably attached to the interactive multi-lane archway truss, the second set of cameras comprising a third bottom camera associated with the second vertical support member, a fourth bottom camera associated with the third vertical support member, and a second top camera associated with the horizontal top member, the second set of cameras positioned to capture images of a second object passing through the second lane;
  a third barrier attached to the third vertical support member, wherein the second barrier and the third barrier provide a screen preventing the second set of cameras from capturing images of objects outside the second lane; and
  a digital display device removably attached to the interactive multi-lane archway truss device, the digital display device covering at least a portion of a front facing side of the interactive multi-lane archway truss device, wherein the digital display device displays customizable content viewable by users passing through the first lane and the second lane.

18. The interactive multi-lane archway truss device of claim 17, further comprising:
  the first bottom camera located removably attached to a first recessed camera housing associated with a first interior side of the first vertical support member, the first bottom camera positioned to capture a first set of images of the first object passing through the first lane, wherein the first bottom camera is at least partially recessed within the first vertical support member;
  the first top camera removably attached to the first portion of the horizontal top member and positioned to capture a second set of images of the first object passing through the first lane;
  the second bottom camera removably attached to a second recessed camera housing associated with a second interior side of the second vertical support member and positioned to capture a third set of images of the first object passing through the first lane, wherein the second bottom camera is at least partially recessed within the second vertical support member;
  the third bottom camera removably attached to a third recessed camera housing associated with a third interior side of the second vertical support member, the third bottom camera positioned to capture a fourth set of images of the second object passing through the second lane, wherein the third bottom camera is at least partially recessed within the second vertical support member;
  a second top camera removably attached to the second portion of the horizontal top member and positioned to capture a fifth set of images of the second object passing through the second lane; and
  the fourth bottom camera removably attached to a fourth recessed camera housing associated with the fourth interior side of the third vertical support member, the fourth bottom camera positioned to capture a sixth set of images of the second object passing through the second lane, wherein the fourth bottom camera is at least partially recessed within the third vertical support member.

19. The interactive multi-lane archway truss device of claim 18, further comprising:
  the first barrier comprising a first wing panel attached to at least a portion of the front facing side of the first vertical support member and a second wing panel attached to at least a portion of a back facing side of the first vertical support member;
  the second barrier comprising third wing panel attached to at least a portion of the front facing side of the second vertical support member and a fourth wing panel attached to at least a portion of a back facing side of the second vertical support member; and
  the third barrier comprising a fifth wing panel attached to at least a portion of the front facing side of the third vertical support member and a sixth wing panel attached to at least a portion of a back facing side of the third vertical support member.

20. The interactive multi-lane archway truss device of claim 17, further comprising:

a set of RFID tag readers removably attached to the interactive multi-lane archway truss, the set of RFID tag readers generating RFID tag data associated with the objects passing through the first lane and the second lane.

\* \* \* \* \*